US007894638B2

(12) United States Patent
Nakada et al.

(10) Patent No.: US 7,894,638 B2
(45) Date of Patent: Feb. 22, 2011

(54) TRAINING MIMETIC MUSCLES BY EVALUATING A CAPTURED USER'S EXPRESSION AGAINST A GIVEN EXPRESSION

(75) Inventors: Ryuichi Nakada, Kyoto (JP); Takeshi Ando, Kyoto (JP); Masayuki Taira, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 925 days.

(21) Appl. No.: 11/808,489

(22) Filed: Jun. 11, 2007

(65) Prior Publication Data

US 2008/0267459 A1 Oct. 30, 2008

(30) Foreign Application Priority Data

Apr. 24, 2007 (JP) ............................. 2007-114454

(51) Int. Cl.
*G06K 9/00* (2006.01)
(52) U.S. Cl. ........................ 382/118; 382/100; 382/181; 382/190
(58) Field of Classification Search ................. 382/100, 382/118, 181, 190
See application file for complete search history.

(56) References Cited

U.S. PATENT DOCUMENTS

| 7,062,073 | B1 * | 6/2006 | Tumey et al. | 382/118 |
| 7,221,809 | B2 * | 5/2007 | Geng | 382/280 |
| 2008/0212828 | A1 * | 9/2008 | Ishida et al. | 382/100 |
| 2008/0292147 | A1 * | 11/2008 | Bronstein et al. | 382/118 |
| 2008/0317297 | A1 * | 12/2008 | Willmann et al. | 382/118 |

FOREIGN PATENT DOCUMENTS

JP 2004-173960 6/2004

* cited by examiner

*Primary Examiner*—Bhavesh M Mehta
*Assistant Examiner*—Stephen R Koziol
(74) *Attorney, Agent, or Firm*—Nixon & Vanderhye P.C.

(57) ABSTRACT

One of a plurality of prepared given expressions is displayed on a screen. After the given expression is presented to the user, the position of a face feature point is detected from a face image of the user taken by a camera cartridge. Based on the detected position of the face feature point, the user's expression in the face image is expressed in accordance with the evaluation criteria corresponding to the given expression, and an image representing the evaluation result is displayed on the screen. Thus, the user can effectively train the mimetic muscles.

33 Claims, 28 Drawing Sheets

EXERCISE 1

(STILL EXERCISE)

THEN, MAINTAIN THE EXPRESSION FOR 5 SECONDS

F I G. 1 7

| FACE FEATURE POINT | REFERENCE POSITION (FACE COORDINATE SYSTEM) | CURRENT POSITION (FACE COORDINATE SYSTEM) |
|---|---|---|
| P1 | Po1 ( a1, b1 ) | Pc1 ( c1, d1 ) |
| P2 | Po2 ( a2, b2 ) | Pc2 ( c2, d2 ) |
| P3 | Po3 ( a3, b3 ) | Pc3 ( c3, d3 ) |
| P4 | Po4 ( a4, b4 ) | Pc4 ( c4, d4 ) |
| P5 | Po5 ( a5, b5 ) | Pc5 ( c5, d5 ) |
| P6 | Po6 ( a6, b6 ) | Pc6 ( c6, d6 ) |
| P7 | Po7 ( a7, b7 ) | Pc7 ( c7, d7 ) |
| P8 | Po8 ( a8, b8 ) | Pc8 ( c8, d8 ) |
| P9 | Po9 ( a9, b9 ) | Pc9 ( c9, d9 ) |
| P10 | Po10 ( a10, b10 ) | Pc10 ( c10, d10 ) |
| P11 | Po11 ( a11, b11 ) | Pc11 ( c11, d11 ) |
| ⋮ | ⋮ | ⋮ |
| P41 | Po41 ( a41, b41 ) | Pc41 ( c41, d41 ) |
| P42 | Po42 ( a42, b42 ) | Pc42 ( c42, d42 ) |

FIG. 18

| EXERCISE NUMBER | GIVEN EXPRESSION | EVALUATION CRITERION ||
|---|---|---|---|
| | | EVALUATION ITEM | ITEM SCORE REFERENCE VALUE |
| 1 | LOWER THE RIGHT AND LEFT CORNERS OF THE MOUTH | SCORE INCREASED IF THE LEFT CORNER OF THE MOUTH IS LOWERED | 1ST THRESHOLD VALUE A, 2ND THRESHOLD VALUE A, MAXIMUM VALUE A |
| | | SCORE INCREASED IF THE RIGHT CORNER OF THE MOUTH IS LOWERED | 1ST THRESHOLD VALUE B, 2ND THRESHOLD VALUE B, MAXIMUM VALUE B |
| | | SCORE DECREASED IF THE LEFT EYEBROW IS RAISED | 1ST THRESHOLD VALUE C, 2ND THRESHOLD VALUE C, MAXIMUM VALUE C |
| | | SCORE DECREASED IF THE RIGHT EYEBROW IS RAISED | 1ST THRESHOLD VALUE D, 2ND THRESHOLD VALUE D, MAXIMUM VALUE D |
| | | SCORE DECREASED IF THE LEFT EYEBROW IS LOWERED | 1ST THRESHOLD VALUE E, 2ND THRESHOLD VALUE E, MAXIMUM VALUE E |
| | | SCORE DECREASED IF THE RIGHT EYEBROW IS LOWERED | 1ST THRESHOLD VALUE F, 2ND THRESHOLD VALUE F, MAXIMUM VALUE F |
| | | SCORE DECREASED IF THE LEFT EYE IS CLOSED | 1ST THRESHOLD VALUE G, 2ND THRESHOLD VALUE G, MAXIMUM VALUE G |
| | | SCORE DECREASED IF THE RIGHT EYE IS CLOSED | 1ST THRESHOLD VALUE H, 2ND THRESHOLD VALUE H, MAXIMUM VALUE H |
| 2 | CLOSE THE LEFT EYE | SCORE INCREASED IF THE LEFT EYE IS CLOSED | 1ST THRESHOLD VALUE I, 2ND THRESHOLD VALUE I, MAXIMUM VALUE I |
| | | SCORE DECREASED IF THE RIGHT EYE IS CLOSED | 1ST THRESHOLD VALUE J, 2ND THRESHOLD VALUE J, MAXIMUM VALUE J |
| | | SCORE DECREASED IF THE LEFT EYEBROW IS RAISED | 1ST THRESHOLD VALUE K, 2ND THRESHOLD VALUE K, MAXIMUM VALUE K |
| | | SCORE DECREASED IF THE RIGHT EYEBROW IS RAISED | 1ST THRESHOLD VALUE L, 2ND THRESHOLD VALUE L, MAXIMUM VALUE L |
| | | SCORE DECREASED IF THE LEFT EYEBROW IS LOWERED | 1ST THRESHOLD VALUE M, 2ND THRESHOLD VALUE M, MAXIMUM VALUE M |
| | | SCORE DECREASED IF THE RIGHT EYEBROW IS LOWERED | 1ST THRESHOLD VALUE N, 2ND THRESHOLD VALUE N, MAXIMUM VALUE N |
| | | SCORE DECREASED IF THE MOUTH IS OPENED | 1ST THRESHOLD VALUE O, 2ND THRESHOLD VALUE O, MAXIMUM VALUE O |
| | | SCORE DECREASED IF THE MOUTH IS RAISED | 1ST THRESHOLD VALUE P, 2ND THRESHOLD VALUE P, MAXIMUM VALUE P |
| | | SCORE DECREASED IF THE MOUTH IS LOWERED | 1ST THRESHOLD VALUE Q, 2ND THRESHOLD VALUE Q, MAXIMUM VALUE Q |
| | | SCORE DECREASED IF THE CORNERS OF THE MOUTH IS WIDENED | 1ST THRESHOLD VALUE R, 2ND THRESHOLD VALUE R, MAXIMUM VALUE R |
| | | SCORE DECREASED IF THE CORNERS OF THE MOUTH IS NARROWED | 1ST THRESHOLD VALUE S, 2ND THRESHOLD VALUE S, MAXIMUM VALUE S |
| ⋮ | ⋮ | ... | ... |
| | | ... | ... |
| | | ⋮ | ⋮ |

F I G. 2 4
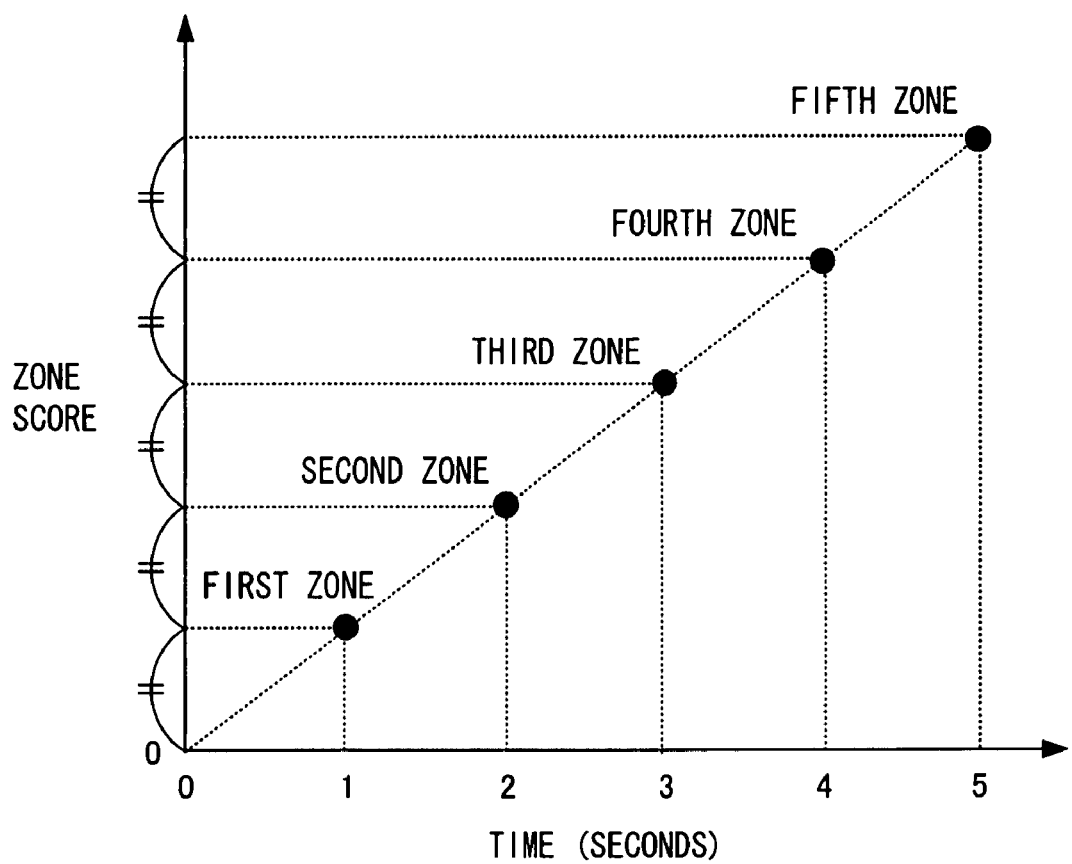

F I G. 2 5
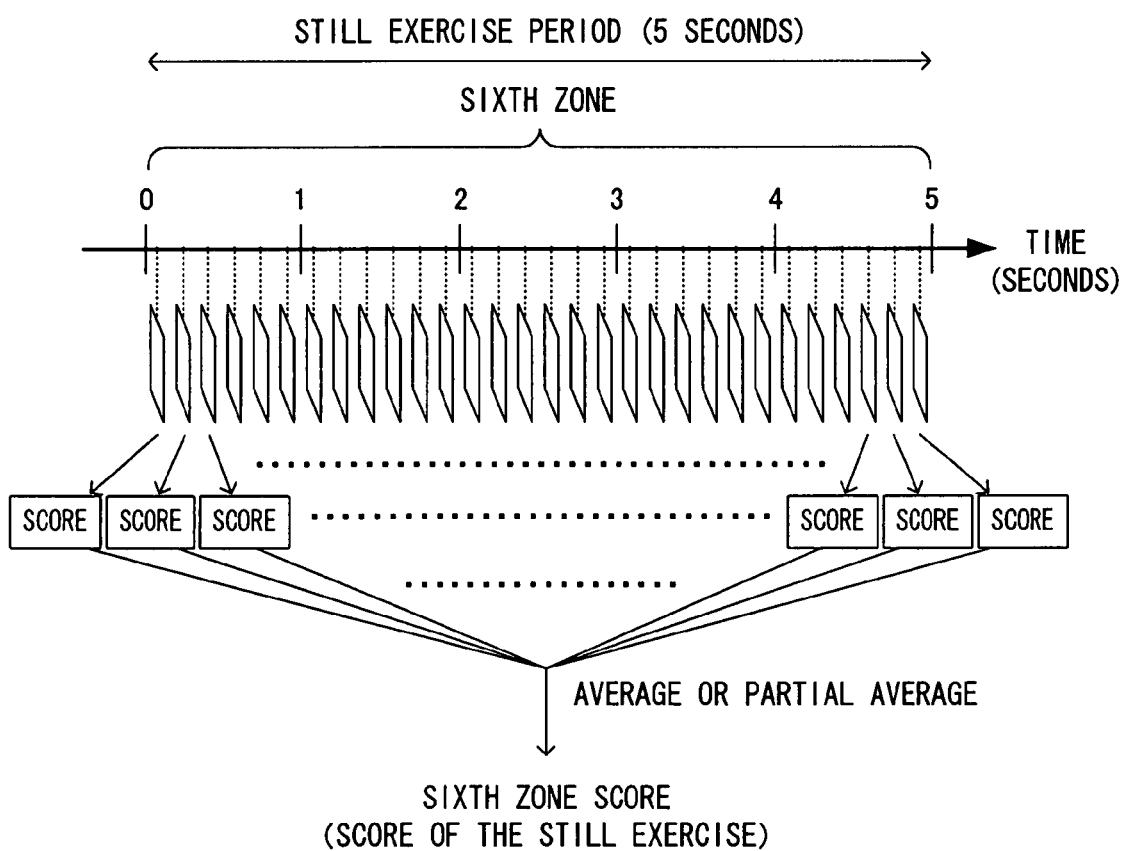

| GIVEN EXPRESSION | EVALUATION CRITERION | |
|---|---|---|
| | FACE FEATURE POINT TO BE REFERRED TO | TARGET POSITION |
| RAISE THE RIGHT AND LEFT CORNERS OF THE MOUTH | LEFT CORNER OF THE MOUTH | (x1, y1) |
| | LEFT CORNER OF THE MOUTH | (x2, y2) |
| SEPARATE FURTHER THE RIGHT CORNER AND THE LEFT CORNER OF THE MOUTH | RIGHT CORNER OF THE MOUTH | (x3, y3) |
| | RIGHT CORNER OF THE MOUTH | (x4, y4) |
| ⋮ | ⋮ | ⋮ |

TRAINING MIMETIC MUSCLES BY EVALUATING A CAPTURED USER'S EXPRESSION AGAINST A GIVEN EXPRESSION

CROSS REFERENCE TO RELATED APPLICATION

The disclosure of Japanese Patent Application No. 2007-114454, filed on Apr. 24, 2007, is incorporated herein by reference.

TECHNICAL FIELD

The present invention relates to a computer-readable storage medium having stored thereon a training program and a training apparatus usable for such a training program, and more specifically to a computer-readable storage medium having stored thereon a training program which supports a training of mimetic muscles and a training apparatus usable for such a training program.

BACKGROUND AND SUMMARY

Conventionally, there is a game apparatus capable of taking an image of a face of each of players by imaging means and allowing the players to fight against each other using such images (see, for example, Japanese Laid-Open Patent Publication No. 2004-173960). This game apparatus reads an image of the player's face, extracts face feature point data of the read image of the face and calculates score data from the face feature point data using a specific calculation equation and a specific coefficient. The pieces of score data thus obtained regarding a plurality of players are compared with each other to determine which player wins.

However, the game apparatus described in Japanese Laid-Open Patent Publication No. 2004-173960 does not have a function of instructing the player to make a predetermined facial expression or a function of evaluating the facial expression made by the player in accordance with the instruction. Therefore, this game apparatus is not usable for training mimetic muscles.

As supporting tools for a training of mimetic muscles, books having drawings or photos representing model expressions are conventionally provided. For training mimetic muscles with such books, the user needs to evaluate himself/herself whether he/she can make a facial expression like the model while looking at a mirror and thus cannot obtain any objective evaluation.

Therefore, a feature of the present invention is to provide a computer-readable storage medium having stored thereon a training program allowing the user to train his/her mimetic muscles effectively and a training apparatus usable for such a training program.

The present invention has the following features. The reference numerals in parentheses in this section of the specification indicate the correspondence with the embodiments described later and the drawings for easier understanding of the present invention, and do not limit the present invention in any way.

A storage medium according to the present invention is a computer-readable storage medium having stored thereon a training program (50) for supporting a training of mimetic muscles. The training program causes a computer (21) to execute a selection step (S23), a face image obtaining step (S51), a face feature point detection step (S51), an evaluation step (S24, S26), and an evaluation result presentation step (S29). The selection step selects a given expression to be made by a user among a plurality of prepared given expressions. The face image obtaining step obtains a face image of the user by an imaging device (38) connected to the computer. The face feature point detection step detects a position of a face feature point corresponding to at least the given expression selected in the selection step, from the face image obtained in the face image obtaining step. The evaluation step evaluates the user's expression in the face image obtained in the face image obtaining step based on the position of the face feature point detected in the face feature point detection step, in accordance with an evaluation criterion corresponding to the given expression selected in the selection step among evaluation criteria (52) respectively preset for the plurality of given expressions. The evaluation result presentation step presents a result of the evaluation in the evaluation step to the user through an image or an audio signal.

The evaluation criteria may be preset such that a different face feature point is to be referred to in accordance with a different given expression; and in the evaluation step, the user's expression in the face image obtained in the face image obtaining step may be evaluated by referring to a position of a face feature point corresponding to the given expression selected in the selection step. Owing to this, the user's expression can be appropriately evaluated in accordance with the given expression.

In the face feature point detection step, positions of at least two face feature points corresponding to the given expression selected in the selection step may be detected from the face image obtained in the face image obtaining step; and in the evaluation step, the user's expression in the face image may be evaluated based on the positional relationship between the two face feature points detected in the face feature point detection step.

The evaluation step may include a step of calculating a distance between the two face feature points detected in the face feature point detection step; and a step of evaluating the user's expression in the face image obtained in the face image obtaining step based on the calculated distance. Owing to this, the user's expression can be evaluated from the viewpoint of how much the specific two face feature points are separated from each other.

Target distance data may be preset for each of the plurality of given expressions; and in the evaluation step, the user's expression in the face image obtained in the face image obtaining step may be evaluated by comparing the distance calculated in the step of calculating the distance and a distance represented by the target distance data corresponding to the given expression selected in the selection step among the target distance data preset for each of the plurality of given expressions.

In the evaluation step, the user's expression in the face image obtained in the face image obtaining step may be evaluated based on the positional relationship between the position of the face feature point detected in the face feature point detection step and a reference position of the face feature point stored on a storage device (24).

Target distance data may be preset for each of the plurality of given expressions; and the evaluation step may include a step of calculating a distance between the position of the face feature point detected in the face feature point detection step and a reference position of the face feature point stored on the storage device; and a step of evaluating the user's expression in the face image obtained in the face image obtaining step by comparing the calculated distance and a distance represented by the target distance data corresponding to the given expression selected in the selection step among the target distance data preset for each of the plurality of given expressions.

The training program may cause the computer to further execute a reference face image obtaining step (S51), a reference position detection step (S51), and a reference position storage step (S22). The reference face image obtaining step obtains a face image of the user in an expressionless state by the imaging device as a reference face image at least before the face image obtaining step. The reference position detection step detects a position of a preset face feature point in the face image obtained in the reference face image obtaining step. The reference position storage step stores, on the storage device, the position of the face feature point detected in the reference position detection step as a reference position of the face feature point. Owing to this, the reference position of the face feature point is set based on the face image of the user. Thus, the user's expression can be more appropriately evaluated.

In the reference position detection step, positions of a plurality of face feature points in the face image obtained in the reference face image obtaining step may be detected; in the reference position storage step, the positions of the plurality of face feature points may be stored on the storage device; in the face feature point detection step, the positions of the plurality of face feature points may be detected from the face image obtained in the face image obtaining step; either one of the plurality of face feature points may be designated as a face feature point to be used for evaluating the face image for each of the plurality of given expressions; and in the evaluation step, the user's expression in the face image obtained in the face image obtaining step may be evaluated by comparing the position of the face feature point corresponding to the given expression selected in the selection step among the plurality of face feature points detected in the face feature point detection step and the position of the face feature point corresponding to the given expression selected in the selection step among the plurality of face feature points stored in the reference position storage step, in accordance with the evaluation criterion corresponding to the given expression selected in the selection step.

The evaluation step may include a step of calculating a distance between the position of the face feature point detected in the face feature point detection step and a reference position of the face feature point stored on the storage device; and a step of evaluating the user's expression in the face image obtained in the face image obtaining step based on the calculated distance. Owing to this, the user's expression can be evaluated from the viewpoint of how much the face feature point in the user's face image has moved from the reference position.

In the evaluation step, a score of the face image obtained in the face image obtaining step may be calculated based on the position of the face feature point detected in the face feature point detection step in accordance with the evaluation criterion corresponding to the given expression selected in the selection step among the evaluation criteria respectively preset for the plurality of given expressions; and in the evaluation result presentation step, the score calculated in the evaluation step may be presented to the user through an image or an audio signal. Owing to this, the score of the user's expression can be calculated from the viewpoint of how much the face feature point in the user's face image has moved from the reference position. Here, the "score" may be any of "item score", "score of the face image", "zone score", "score of the moving exercise" and "score of the still exercise" in the embodiments described later.

In the face image obtaining step, a plurality of face images taken at different times during a predetermined time period may be obtained; in the face feature point detection step, a position of a face feature point corresponding to at least the given expression selected in the selection step may be detected from each of the plurality of face images obtained in the face image obtaining step; and in the evaluation step, the user's expression in the plurality of face images obtained in the face image obtaining step may be evaluated based on the positions of the face feature points in the plurality of face images detected in the face feature point detection step. Owing to this, the user's expression can be evaluated from a more diversified range of viewpoints than the case where the user's expression is evaluated based on one frame image.

In the face image obtaining step, the plurality of face images may be each obtained at a cycle of a constant time period. Owing to this, the position of the face feature point in the middle of the change of the user's expression can be obtained.

The evaluation step may include a step of calculating a score of each of the plurality of face images obtained in the face image obtaining step in the predetermined time period based on the position of the face feature point in the respective face image detected in the face feature point detection step; and a step of evaluating the user's expression in the plurality of face images obtained in the face image obtaining step in the predetermined time period, using scores of the plurality of face images other than at least one score which is equal to or lower than a certain value or which is relatively low. Owing to this, the score of the face image can be varied in consideration of the time-wise change of the user's expression.

The evaluation step may include a step of calculating a score of each of the plurality of face images obtained in the face image obtaining step in the predetermined time period based on the position of the face feature point in the respective face image detected in the face feature point detection step; and a step of obtaining an average of the scores of the plurality of face images obtained in the face image obtaining step in the predetermined time period, and evaluating the user's expression in the face images using the average.

The evaluation step may include a first evaluation step of evaluating the user's expression in each of the plurality of face images obtained in the face image obtaining step based on the position of the face feature point in the respective face image detected in the face feature point detection step, such that the user's expression is evaluated higher as the face image is closer to the given expression selected in the selection step; and a second evaluation step of evaluating the user's expression in accordance with whether or not a face image taken later is evaluated higher, based on the evaluation result of the first evaluation step. Owing to this, it can be evaluated whether or not the user's expression is smoothly changed.

The evaluation step may include a step (S52) of calculating the score of each of the plurality of face images obtained in the face image obtaining step based on the position of the face feature point detected in the face feature point detection step; a step of correcting the score of at least one face image (for example, the fifth zone score in the embodiment described later) in accordance with whether or not a face image taken later is evaluated higher; and a step of evaluating the user's expression in accordance with at least the corrected score. Owing to this, the score of the face image can be varied in accordance with whether or not the user's expression is smoothly changed.

The training may be for smoothly changing an expressionless state to a given expression at a constant speed; and the evaluation step may include a step of calculating the score of each of the face images obtained in the face image obtaining step based on the position of the face feature point in the respective face image detected in the face feature point detection step, such that a face image closer to the given expression selected in the selection step is evaluated higher; and a step (S47) of evaluating the user's expression in accordance with whether or not the scores of the face images linearly increase in accordance with the time at which the face images are taken. Owing to this, it can be evaluated whether or not the user's expression is smoothly changed.

The evaluation step may include a step (S52) of calculating the score of each of the face images obtained in the face image obtaining step based on the position of the face feature point in the respective face image detected in the face feature point detection step; a step (S47) of correcting the score of at least one face image (for example, the fifth zone score in the embodiment described later) in accordance with whether or not the scores of the face images linearly increase in accordance with the time at which the face images are taken; and a step of evaluating the user's expression in accordance with at least the corrected score. Owing to this, the score of the face image can be varied in accordance with whether or not the user's expression is smoothly changed.

In the face image obtaining step, a plurality of face images taken at different times may be obtained; in the face feature point detection step, a position of a face feature point corresponding to at least the given expression selected in the selection step may be detected from each of the plurality of face images obtained in the face image obtaining step; and the evaluation step may include a step (S54) of calculating a score of each of the plurality of face images obtained in the face image obtaining step based on the position of the face feature point in the respective face image detected in the face feature point detection step; a step (S57) of calculating at least one of a maximum value, a minimum value, an average value and a partial average value of the scores of the plurality of face images; and a step of evaluating the user's expression in accordance with the at least one of the maximum value, the minimum value, the average value and the partial average value. Owing to this, the user's expression can be evaluated with high precision without relying on the detection precision of the face feature point.

The evaluation step may include a step (S54) of calculating a score of each of the plurality of face images obtained in the face image obtaining step based on the position of the face feature point in the respective face image detected in the face feature point detection step; a step (S57) of calculating an average of the scores of a part of the plurality of face images having a relatively high score as a partial average value of the plurality of face images; and a step of evaluating the user's expression in accordance with the partial average value. Owing to this, the user's expression can be evaluated with high precision without relying on the detection precision of the face feature point.

In the face image obtaining step, a plurality of face images taken at different times during a predetermined time period (for example, in the moving exercise period in the embodiment described later) may be obtained; in the face feature point detection step, a position of a face feature point corresponding to at least the given expression selected in the selection step may be detected from each of the plurality of face images obtained in the face image obtaining step; and the evaluation step may include a step (S54) of calculating a score of each of a plurality of face images obtained in each of a plurality of zones (for example, first through fifth zones in the embodiment described later) included in the predetermined time period, based on the position of the face feature point in the respective face image detected in the face feature point detection step; a step (S57) of calculating a zone score of each zone based on the scores of the plurality of face images obtained in the respective zone; and a step of evaluating the user's expression in accordance with the zone scores of the plurality of zones (FIG. 22). Owing to this, the user's expression can be evaluated with high precision without relying on the detection precision of the face feature point.

In the face feature point detection step, positions of at least a first face feature point and a second face feature point may be detected from the face image obtained in the face image obtaining step; and the evaluation step may include a step of increasing (S74) a score of the face image obtained in the face image obtaining step based on the positional relationship between the position of the first face feature point detected in the face feature point detection step and a reference position of the first face feature point stored on the storage device; and a step (S74) of decreasing the score of the face image obtained in the face image obtaining step based on the positional relationship between the position of the second face feature point detected in the face feature point detection step and a reference position of the second face feature point stored on the storage device. Owing to this, the user's expression may be appropriately evaluated in an exercise of, for example, moving one face feature point without moving the other face feature points.

In the face feature point detection step, positions of at least a first face feature point and a second face feature point may be detected from the face image obtained in the face image obtaining step; and the evaluation step may include a step (S74) of increasing a score of the face image obtained in the face image obtaining step based on the positional relationship between the position of the first face feature point detected in the face feature point detection step and a reference position of the first face feature point stored on the storage device; a step (S74) of increasing the score of the face image obtained in the face image obtaining step based on the positional relationship between the position of the second face feature point detected in the face feature point detection step and a reference position of the second face feature point stored on the storage device; and a step (S74) of varying the score of the face image obtained in the face image obtaining step based on the positional relationship between the position of the first face feature point and the position of the second face feature point both detected in the face feature point detection step. Owing to this, the user's expression may be appropriately evaluated in an exercise of, for example, moving specific two face feature points in a well balanced state.

The training program may cause the computer to further execute a face coordinate system setting step (S34 through S36) of, after the face feature point detection step, setting an origin and a coordinate axis of a face coordinate system based on positions of at least two predetermined face feature points among a plurality of face feature points detected in the face feature point detection step; and a step (S37 through S38) of converting a coordinate set representing the position of each of the face feature points detected in the face feature point detection step to a coordinate set of the face coordinate system set in the face coordinate system setting step.

In the face coordinate system setting step, a direction of the coordinate axis (X axis, Y axis) of the face coordinate system may be set based on a direction of a straight line connecting at least two predetermined face feature points (P13, P22) among the plurality of face feature points detected in the face feature point detection step. Owing to this, even when the user's face is rotated around the optical axis of the lens of the imaging device, the coordinate set of each face feature point does not change accordingly. Therefore, the user's expression can be evaluated accurately.

In the face coordinate system setting step, a scale (the magnitude of X axis unit vector, the magnitude of Y axis unit vector) of the coordinate axis (X axis, Y axis) of the face coordinate system may be set based on a distance between at least two predetermined face feature points (P13, P22) among the plurality of face feature points detected in the face feature point detection step. Thus, even when the distance between the imaging device and the user's face is changed, the coordinate set of each face feature point does not change accordingly. Therefore, the user's expression can be evaluated accurately.

The training program may cause the computer to further execute a step of displaying a model image (40) corresponding to the given expression selected in the selection step on a screen (11). Owing to this, the user can perform an exercise of the mimetic muscles while looking at the model image, and thus can perform the exercise effectively.

The model image may be an animation image (FIG. 6). Owing to this, when performing an exercise of changing the expression slowly, for example, the user can perform an exercise of the mimetic muscles while looking at the model image represented by the animation image and thus can perform the exercise effectively.

The training program may cause the computer to further execute a step of displaying a face image of the user taken by the imaging device on a screen (12). Owing to this, the user can perform an exercise of the mimetic muscles while looking at his/her actual expression, and thus can perform the exercise effectively.

The training program may cause the computer to further execute a step of displaying a model image corresponding to the given expression selected in the selection step and a face image of the user taken by the imaging device on an identical screen or on different screens (11, 12) simultaneously (FIG. 7). Owing to this, the user can perform an exercise of the mimetic muscles while comparing the model image and his/her actual expression, and thus can perform the exercise effectively.

A training apparatus (10) according to the present invention is for supporting a training of mimetic muscles. The training apparatus comprises selection means (21), face image obtaining means (21), face feature point detection means (21), evaluation means (21), and evaluation result presentation means (21). The selection means selects a given expression to be made by a user among a plurality of prepared given expressions. The face image obtaining means obtains a face image of the user by an imaging device (38). The face feature point detection means detects a position of a face feature point corresponding to at least the given expression selected by the selection means, from the face image obtained by the face image obtaining means. The evaluation means evaluates the user's expression in the face image obtained by the face image obtaining means based on the position of the face feature point detected by the face feature point detection means, in accordance with an evaluation criterion corresponding to the given expression selected by the selection means among evaluation criteria (52) respectively preset for the plurality of given expressions. The evaluation result presentation means presents a result of the evaluation by the evaluation means to the user through an image or an audio signal.

According to the present invention, the user can obtain an objective evaluation result when training the mimetic muscles and thus can perform the training effectively.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 shows face feature point data in detail;

FIG. 18 shows evaluation criterion information in detail;

FIG. 24 shows another method for calculating a score of the moving exercise;

FIG. 25 shows a method for calculating a score of a still exercise;

DETAILED DESCRIPTION

Hereinafter, embodiments of the present invention will be described.

Figure 1:
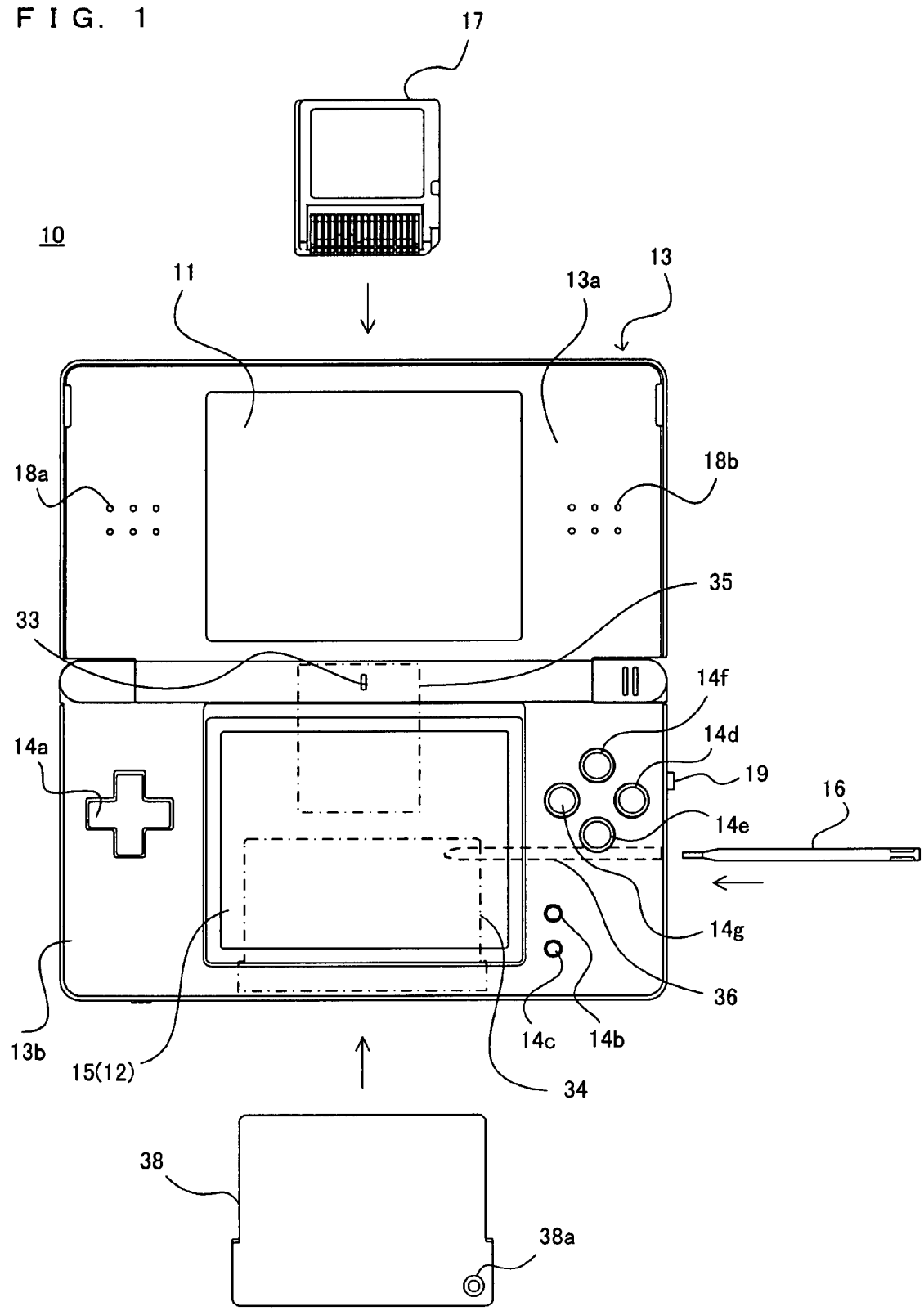
FIG. 1 is an external view of a game apparatus according to one embodiment of the present invention.

FIG. 1 is an external view of a game apparatus according to one embodiment of the present invention. The present invention is applicable to an installation type game apparatus as well as a mobile game apparatus. The present invention is applicable to any information processing apparatus (e.g., a personal computer, a mobile phone, etc.) as well as a game apparatus.

As shown in FIG. 1, a game apparatus 10 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. The first LCD 11 and the second LCD 12 both have a resolution of 256 dots×192 dots. In this embodiment, LCDs are used as display devices, but the present invention is applicable to apparatuses using any other display devices such as EL (Electro Luminescence) devices or the like. The first LCD 11 and the second LCD 12 may have any resolution.

The upper housing 13a has speaker holes 18a and 18b for releasing a sound from a pair of speakers (represented with reference numerals 30a and 30b in FIG. 3) described later. A microphone hole 33 is provided in a hinge for openably/closably connecting the upper housing 13a and the lower housing 13b.

The lower housing 13b has a cross-shaped switch 14a, a start switch 14b, a select switch 14c, an A button 14d, a B button 14e, an X button 14f, and a Y button 14g provided thereon as input elements. On a side surface of the lower housing 13b, an L button and an R button (not shown) are provided. A touch panel 15 is provided on a screen of the second LCD 12 as an additional input element. Also on side surfaces of the lower housing 13b, a power switch 19, an insertion hole 35 for connecting a memory card 17, an insertion hole 36 for accommodating a stick 16, and an insertion hole 34 for connecting a camera cartridge 38.

The touch panel 15 may be of any system; for example, a resistance film system, an optical (infrared) system, or a static capacitance coupling system. The touch panel 15 is operable with the stick 16 or a finger. In this embodiment, the touch panel 15 has a resolution (detection precision) of 256 dots× 192 dots like the second LCD 12. It is not absolutely necessary that the touch panel 15 has the same resolution as that of the second LCD 12.

Figure 3:
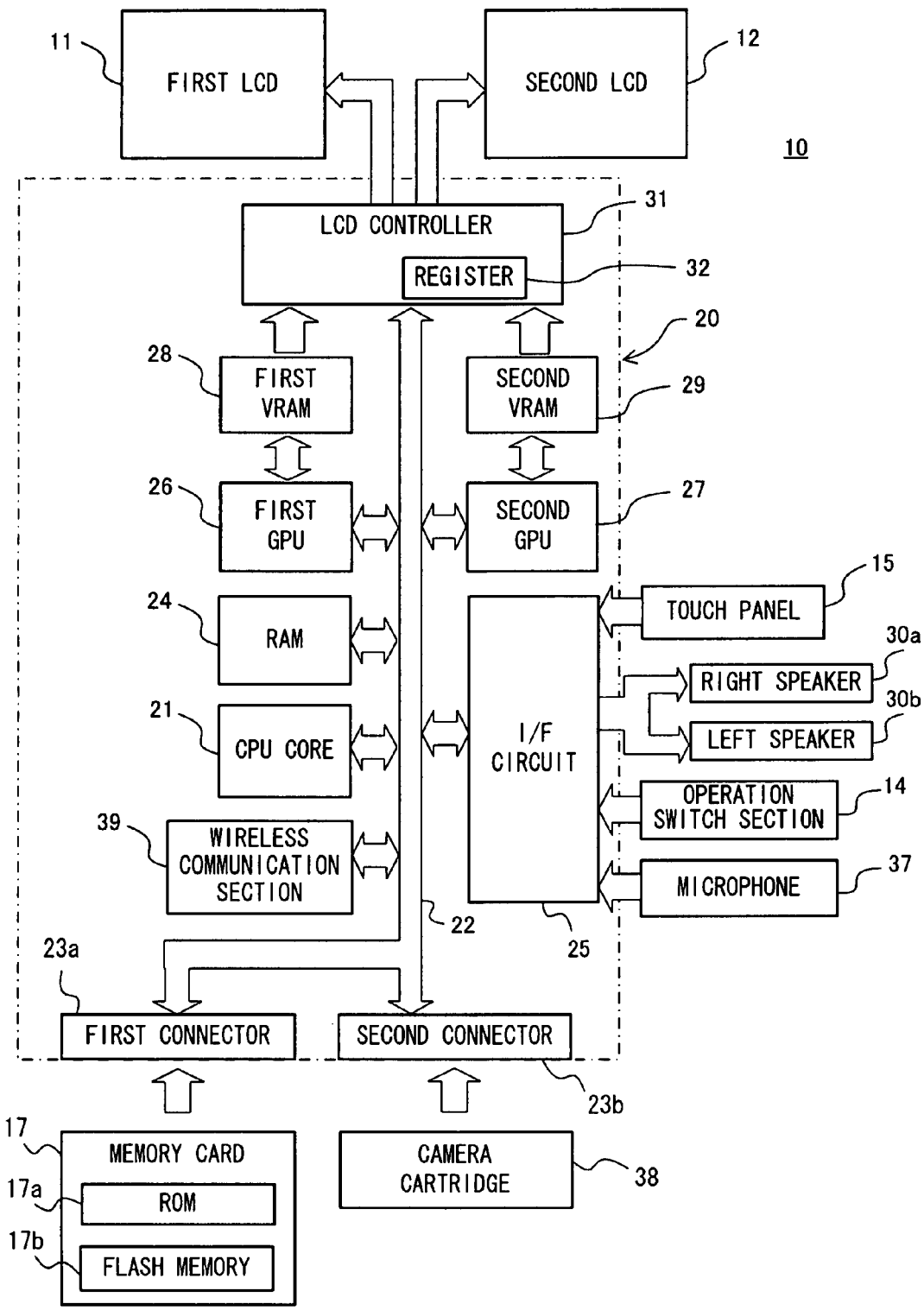
FIG. 3 is a block diagram showing an internal structure of the game apparatus.

The memory card 17 is a storage medium having stored thereon a training program, which is a computer program to be executed by the game apparatus 10, and is detachably insertable into the insertion hole 35 of the lower housing 13b. As shown in FIG. 3, a first connector 23a is provided deep in the insertion hole 35 for connecting the game apparatus 10 to a connector (not shown) at an insertion tip of the memory card 17. When the memory card 17 is inserted into the insertion hole 35, the connector of the memory card 17 and the first connector 23a are connected to each other, and thus a CPU core 21 (see FIG. 3) of the game apparatus 10 is made accessible to the memory card 17.

The camera cartridge 38 has a function of imaging a face of a user, and is detachably insertable into the insertion hole 34 of the lower housing 13b. As shown in FIG. 3, a second connector 23b is provided deep in the insertion hole 34 for connecting the game apparatus 10 to a connector (not shown) at an insertion tip of the camera cartridge 38. When the camera cartridge 38 is inserted into the insertion hole 34, the connector of the camera cartridge 38 and the second connector 23b are connected to each other. As shown in FIG. 1, the camera cartridge 38 includes a camera lens 38a at such a position that the camera lens 38a is not hidden by the lower housing 13b even where the camera cartridge 38 is inserted into the insertion hole 34. In the case where the camera lens 38a is provided at such a position that the camera lens 38a is hidden by the lower housing 13b where the camera cartridge 38 is inserted into the insertion hole 34, a part of the camera cartridge 38 including the camera lens 38a may be made movable such that the camera lens 38a is not hidden by the lower housing 13b.

Figure 2:
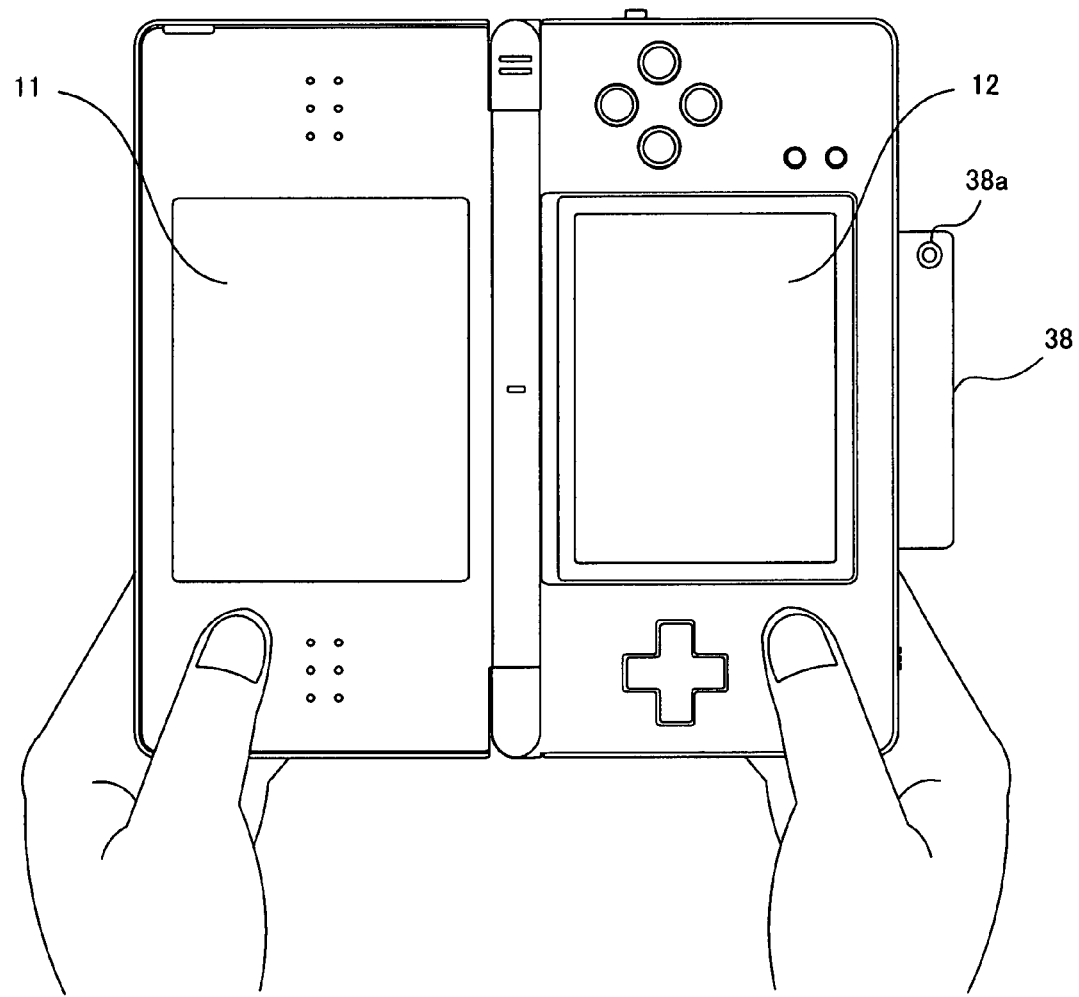
FIG. 2 is an external view of the game apparatus when being used by the user.

In this embodiment, the user trains his/her mimetic muscles while holding the game apparatus 10 with both of his/her hands as shown in FIG. 2 and looking at the screens of the first LCD 11 and the second LCD 12.

With reference to FIG. 3, an internal structure of the game apparatus 10 will be described. FIG. 3 is a block diagram showing an internal structure of the game apparatus 10. As shown in FIG. 3, a CPU core 21 is mounted on an electronic circuit board 20 accommodated in the housing 13. The CPU core 21 is connected to the first connector 23a and the second connector 23b, an input/output interface circuit (represented as "I/F circuit" in FIG. 3) 25, a first GPU (Graphics Processing Unit) 26, a second GPU 27, a RAM 24, an LCD controller 31, and a wireless communication section 39 via a bus 22. The memory card 17 is detachably connected to the first connector 23a. The camera cartridge 38 is detachably connected to the second connector 23b.

The I/F circuit 25 is connected to the touch panel 15, the right speaker 30a, the left speaker 30b, an operation switch section 14 including the cross-shaped switch 14a, the A button 14d and the like shown in FIG. 1, and a microphone 37. The right speaker 30a and the left speaker 30b are respectively located inside the speaker holes 18a and 18b. The microphone 37 is located inside the microphone hole 33.

The first GPU 26 is connected to a first VRAM (Video RAM) 28, and the second GPU 27 is connected to a second VRAM 29. In response to an instruction from the CPU core 21, the first GPU 26 creates a first display image and draws the first display image in the first VRAM 28. Similarly, in response to an instruction from the CPU core 21, the second GPU 27 creates a second display image and draws the second display image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first display image drawn in the first VRAM 28 to the first LCD 11, and outputs the second display image drawn in the second VRAM 29 to the second LCD 12. When the value in the register 32 is "1", the LCD controller 31 outputs the first display image drawn in the first VRAM 28 to the second LCD 12, and outputs the second display image drawn in the second VRAM 29 to the first LCD 11.

The wireless communication section 39 has a function of transmitting or receiving data to or from a wireless communication section of other game apparatus(es). The game apparatus 10 can be connected to a wide area network such as the Internet or the like via the wireless communication section 39, and can communicate with other game apparatus(es) via such a network.

The memory card 17 includes a ROM 17a, which has the above-mentioned training program and various data used for executing the training program (image data, sound data, etc.) stored thereon.

The memory card 17 also includes a flash memory 17b, which is an erasable and writable, i.e., rewritable nonvolatile memory. On the flash memory 17b, saved data representing the result of the execution of the above-mentioned computer program or the like is stored when necessary.

When the user turns on the power of the game apparatus 10 while the memory card 17 is connected to the first connector 23a, the training program stored on the ROM 17a of the memory card 17 is loaded onto the RAM 24. The training program loaded onto the RAM 24 is executed by the CPU core 21. The training program may be read entirely at once, or partially and sequentially when necessary. The RAM 24 has stored thereon temporary data obtained by the execution of the training program by the CPU core 21 and data for generating display images, as well as the training program.

The camera cartridge 38 images the face of the user via the camera lens 38a and outputs the face image data of the user as the result of the imaging.

In this embodiment, the training program is supplied to a main body of the game apparatus 10 from the memory card 17, but the present invention is not limited to such a structure. For example, the training program may be supplied to the game apparatus 10 from any other computer-readable storage medium such as an optical disc or the like, or from another computer via a wired or wireless communication line. The training program may be pre-stored on a nonvolatile memory device inside the main body of the game apparatus 10.

In this embodiment, the camera cartridge 38 includes imaging means, but the present invention is not limited to such a structure. For example, the imaging means may be provided in the main body of the game apparatus 10 (inside the housing 13). Alternatively, the main body of the game apparatus 10 may be connected to the imaging means via a communication cable. Still alternatively, the face image data of the player taken by the imaging means may be supplied to the main body of the game apparatus 10 by wireless communication.

Hereinafter, with reference to FIG. 4 through FIG. 12, an overview of the operation of the game apparatus 10 will be described. The CPU core 21 executes the training program, and thus the game apparatus 10 acts as a training apparatus for supporting the training of the mimetic muscles.

In this embodiment, the user performs four exercises, i.e., exercise 1 through exercise 4 while looking at the images displayed on the screen of the LCD 11 (hereinafter, referred to as the "left screen") and the screen of the LCD 12 (hereinafter, referred to as the "right screen").

Figure 4:
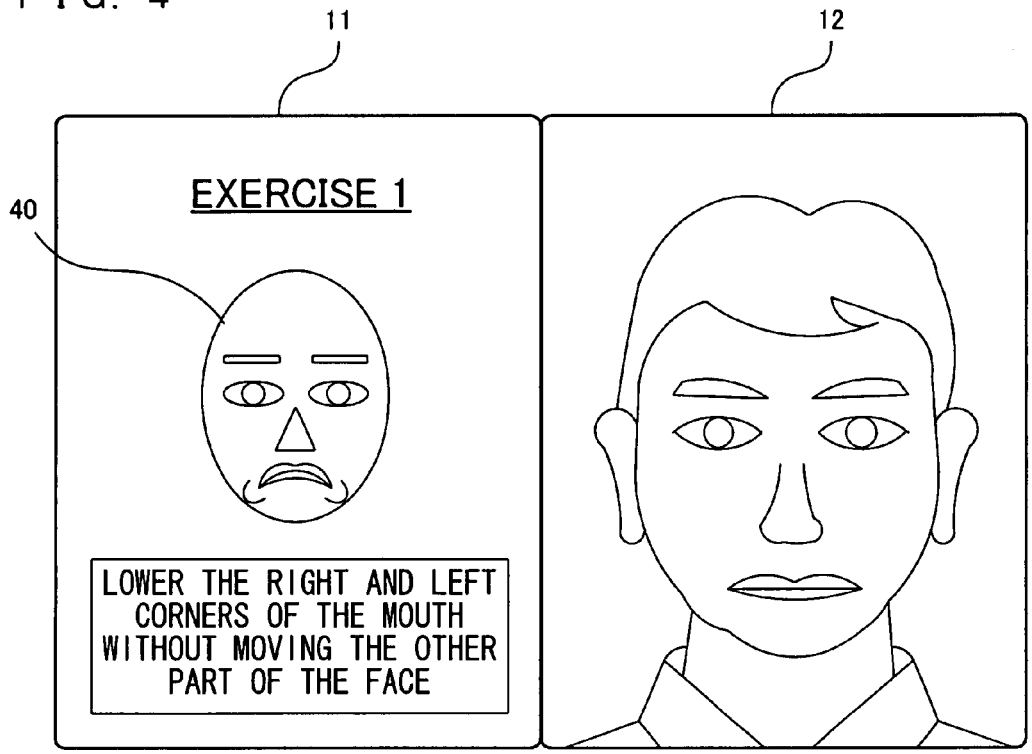
FIG. 4 shows an exemplary image displayed while a training program is executed.

FIG. 4 shows images displayed on the left screen and the right screen when the user starts exercise 1. Exercise 1 is to lower the right and left corners of the mouth. On the left screen, a model image 40 representing the expression that the user is now to make (hereinafter, referred to as a "given expression") and an explanation of the given expression are displayed. On the right screen, the image of the user's face taken by the camera cartridge 38 is displayed in real time. The image of the user's face displayed on the right screen is displayed with the left part and the right part being inverted, as if the user's face was reflected on a mirror. For example, in FIG. 4, the eye displayed on the right half of the right screen is the right eye of the user.

Exercise 1 through exercise 4 each includes two exercises of "moving exercise" and "still exercise". When performing a "moving exercise", the user slowly changes an expressionless state to the designated expression (given expression) in the course of five seconds. When performing a "still exercise", the user maintains the designated expression (given expression) after performing the moving exercise for five seconds. In this embodiment, the moving exercise and the still exercise are each performed for five seconds, but the present invention is not limited to this.

Figure 5:
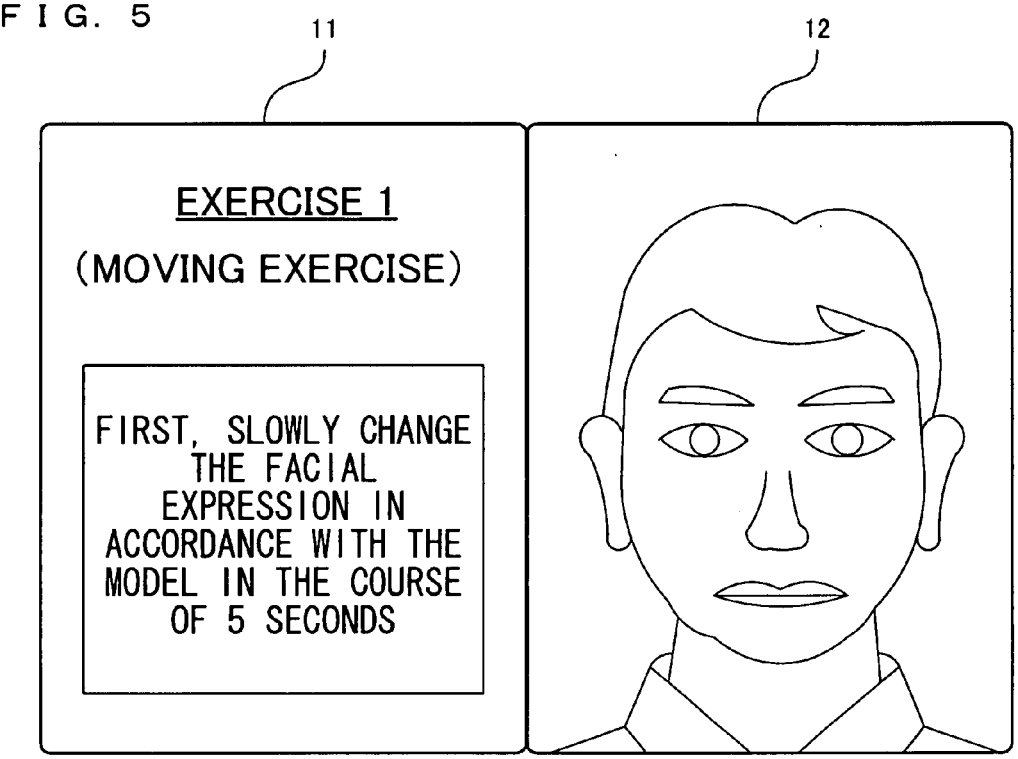
FIG. 5 shows an exemplary image displayed while the training program is executed.

FIG. 5 shows the left screen and the right screen immediately before the moving exercise of exercise 1 (hereinafter, referred to as the "first moving exercise") is started. On the left screen, an explanation of the first moving exercise that the user is now to perform is displayed.

Figure 6:
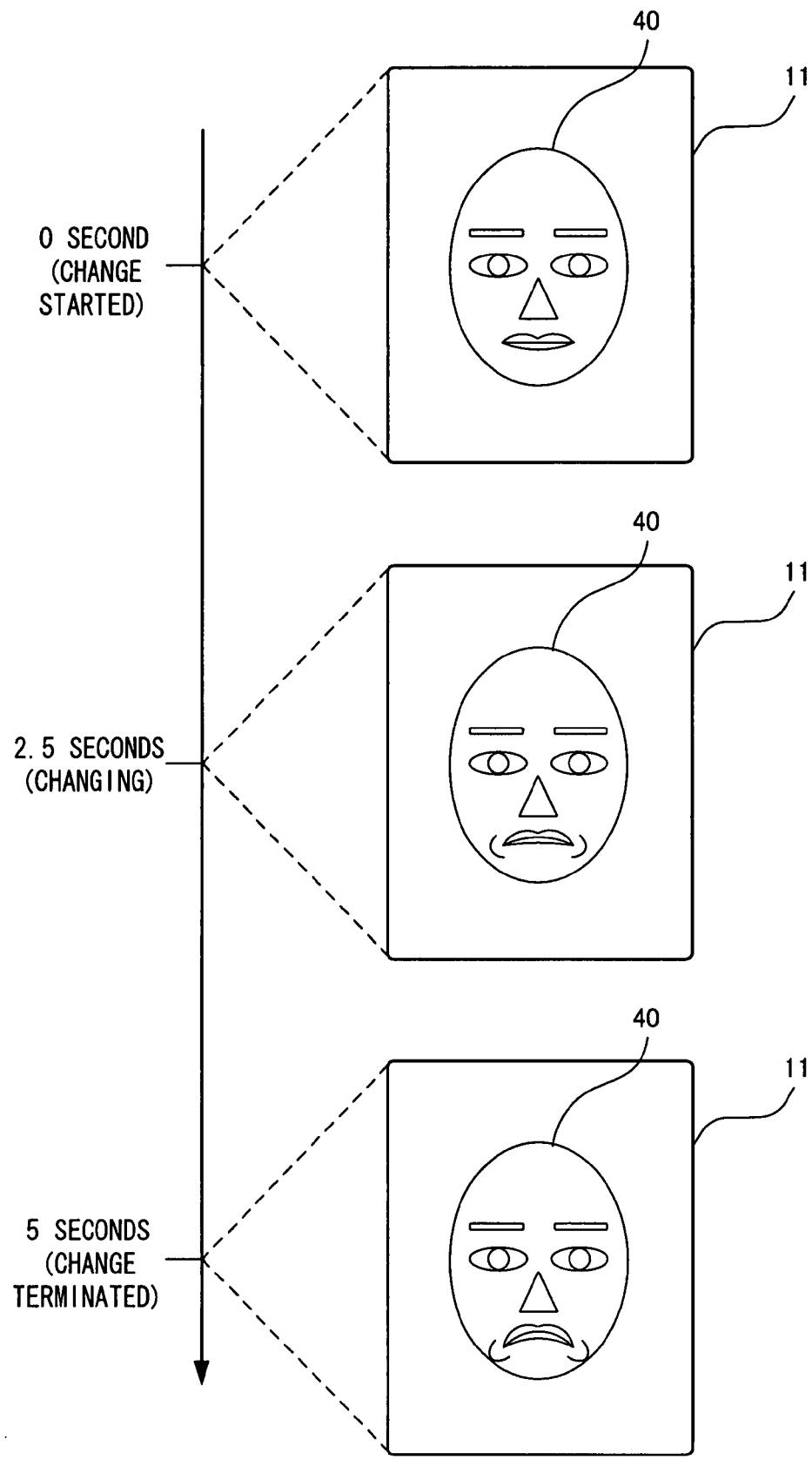
FIG. 6 shows an exemplary image displayed while the training program is executed.

When the first moving exercise is started, an animation of the model image 40 is displayed on the left screen. FIG. 6 shows a change of the model image 40 displayed on the left screen in the first moving exercise. Immediately after the first moving exercise is started, the model image 40 is expressionless. As the time passes, the expression of the model image 40 gradually changes. Immediately before the end of the first moving exercise (i.e., five seconds after the start of the first moving exercise), the model image 40 has the same expression as that of the given expression of exercise 1 (the left screen of FIG. 4). In the moving exercise, the user slowly changes his/her expression in conformity with this change of the model image 40.

Figure 7:
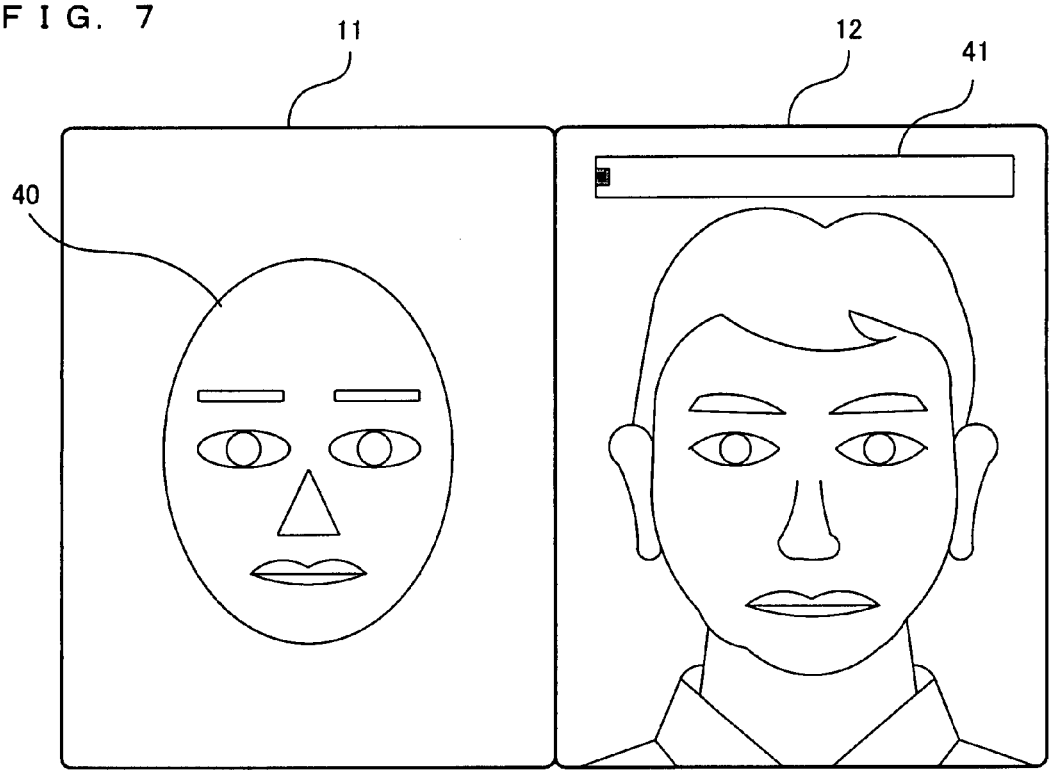
FIG. 7 shows an exemplary image displayed while the training program is executed.

FIG. 7 shows the left screen and the right screen immediately after the first moving exercise is started. The model image 40 is still almost expressionless. On the right screen, a gauge image 41 is displayed representing the time passage from the start of the exercise (i.e., the remaining time until the end of the exercise). Instead of displaying the gauge image 41, numerical figures representing the time passage (the number of seconds) from the start of the exercise may be displayed, or the remaining time until the end of the exercise may be counted down by an audio signal. It is not absolutely necessary to display the time passage or the remaining time.

Figure 8:
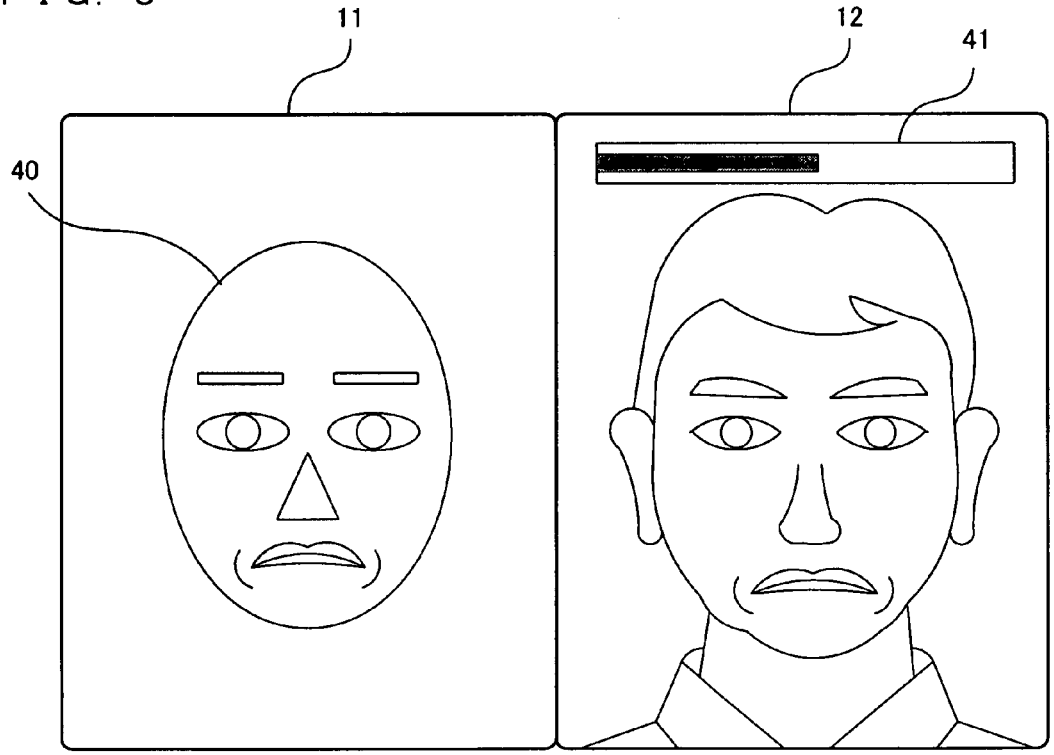
FIG. 8 shows an exemplary image displayed while the training program is executed.

FIG. 8 shows the left screen and the right screen two to three seconds after the start of the first moving exercise. At this point, the right and left corners of the mouth of the model image 40 are slightly lowered. The user also slightly lowers the right and left corners of his/her mouth in conformity with the model image 40.

Figure 9:
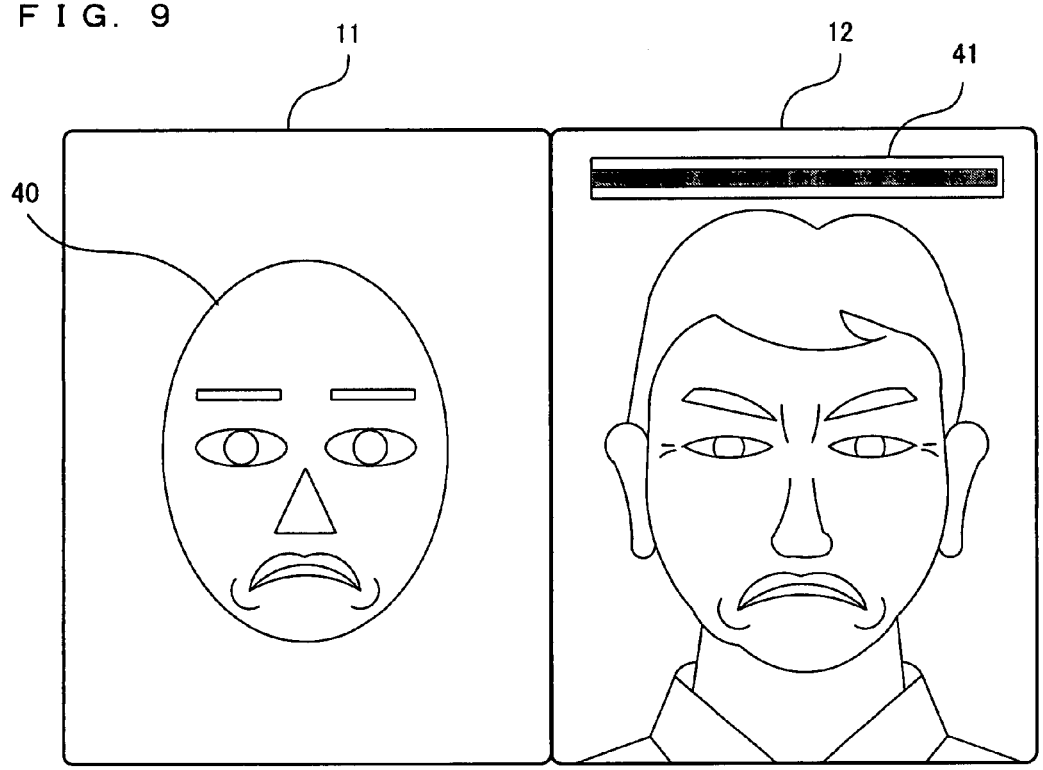
FIG. 9 shows an exemplary image displayed while the training program is executed.

FIG. 9 shows the left screen and the right screen immediately before the end of the first moving exercise. At this point, the right and left corners of the mouth of the model image 40 are significantly lowered. The user also significantly lowers the right and left corners of his/her mouth in conformity with the model image 40. Since the user strongly moves his/her muscles, the right and left eyes are slightly thinner than when the user's face is expressionless.

When five seconds passes from the start of the first moving exercise, the first moving exercise is finished. Then, the program is prepared for the still exercise of exercise 1 (hereinafter, referred to as the "first still exercise").

Figure 10:
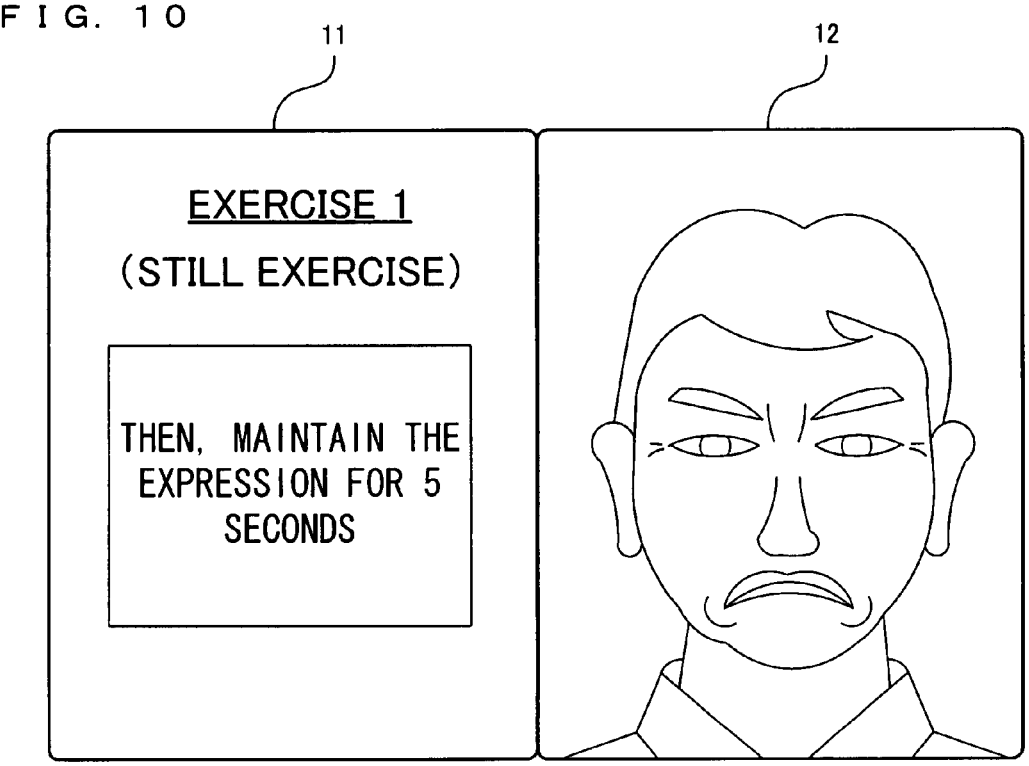
FIG. 10 shows an exemplary image displayed while the training program is executed.

FIG. 10 shows the left screen and the right screen immediately before the start of the first still exercise. On the left screen, an explanation of the first still exercise that the user is now to perform is displayed.

Figure 11:
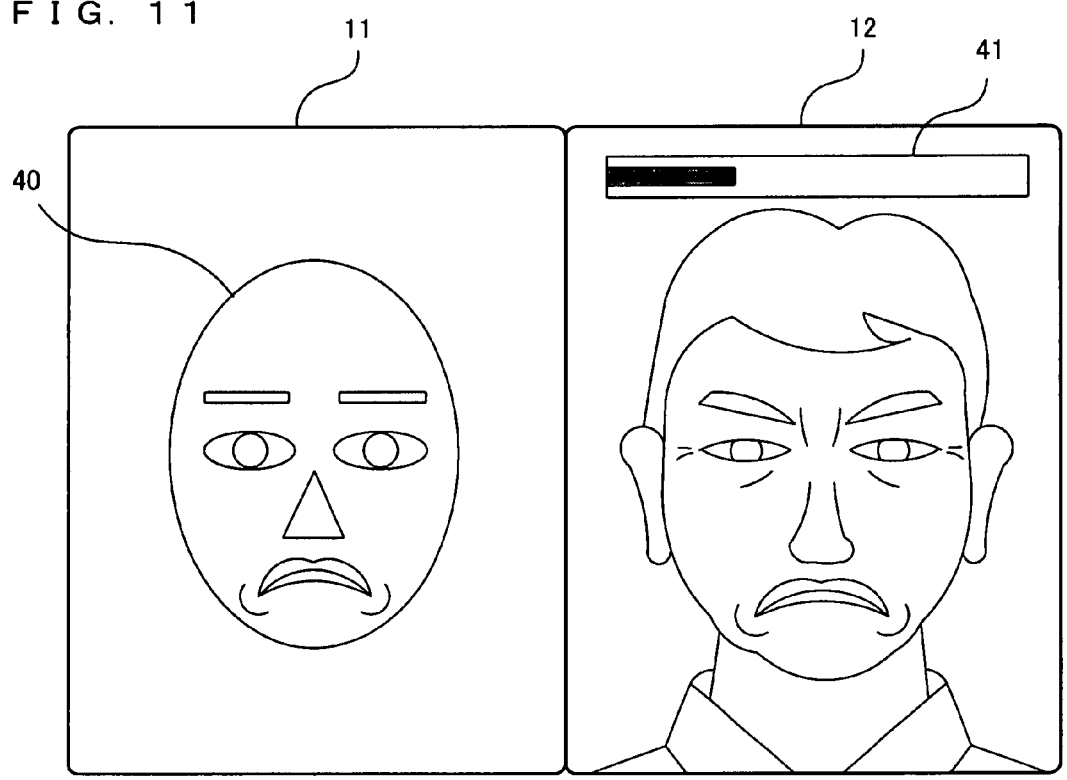
FIG. 11 shows an exemplary image displayed while the training program is executed.

FIG. 11 shows the left screen and the right screen two to three seconds after the start of the first still exercise. For the still exercise also, the model image 40 is displayed on the left screen as for the moving exercise. However, in the case of the still exercise, the model image 40 is kept the same even though the time passes. The user also maintains the expression in which the right and left corners of his/her mouth are lowered in conformity with the model image 40. On the right screen, the gauge image 41 is displayed representing the time passage from the start of the exercise (i.e., the remaining time until the end of the exercise) in the same manner as for the moving exercise. Instead of displaying the gauge image 41, numerical figures representing the time passage (the number of seconds) from the start of the exercise may be displayed, or the remaining time until the end of the exercise may be counted down by an audio signal. It is not absolutely necessary to display the time passage or the remaining time.

When five seconds passes from the start of the first still exercise, the first still exercise is finished. Then, the user performs exercise 2.

Figure 12:
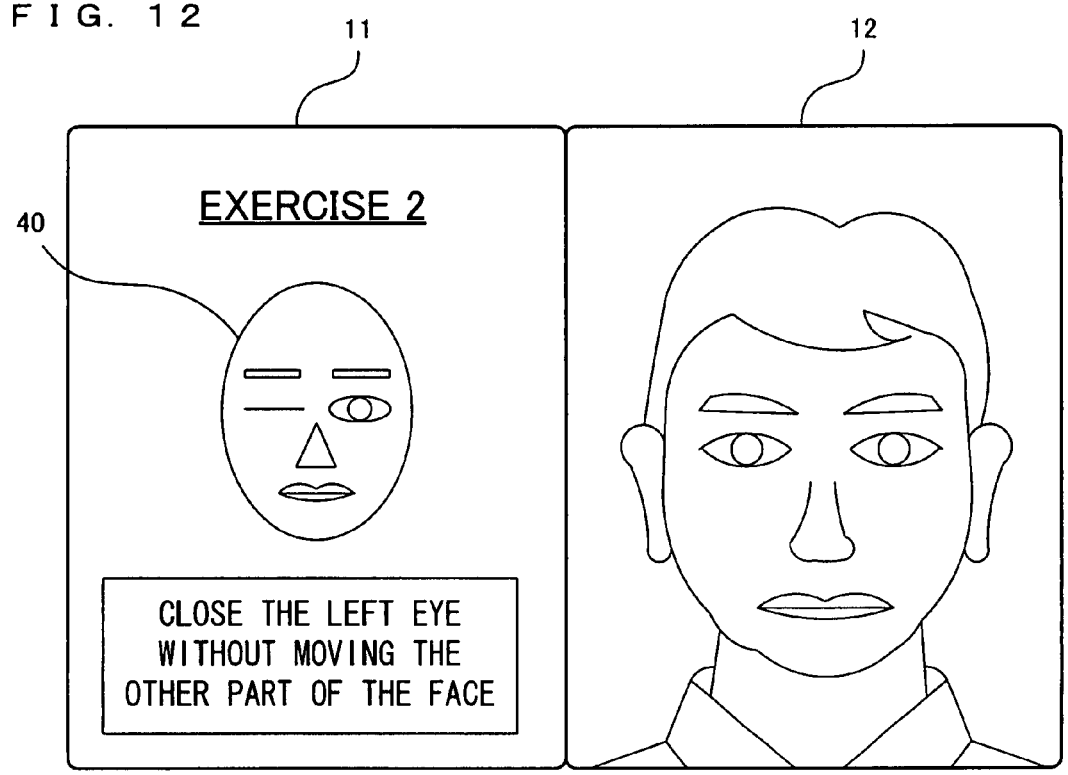
FIG. 12 shows an exemplary image displayed while the training program is executed.

FIG. 12 shows images displayed on the left screen and the right screen when the user starts exercise 2. Exercise 2 is to close the left eye. On the left screen, a model image 40 representing the given expression and an explanation thereof are displayed. Then, a second moving exercise and a second still exercise are performed.

When exercise 2 is terminated, exercise 3 (a third moving exercise and a third still exercise) and then exercise 4 (a fourth moving exercise and a fourth still exercise) are performed sequentially.

Figure 13:
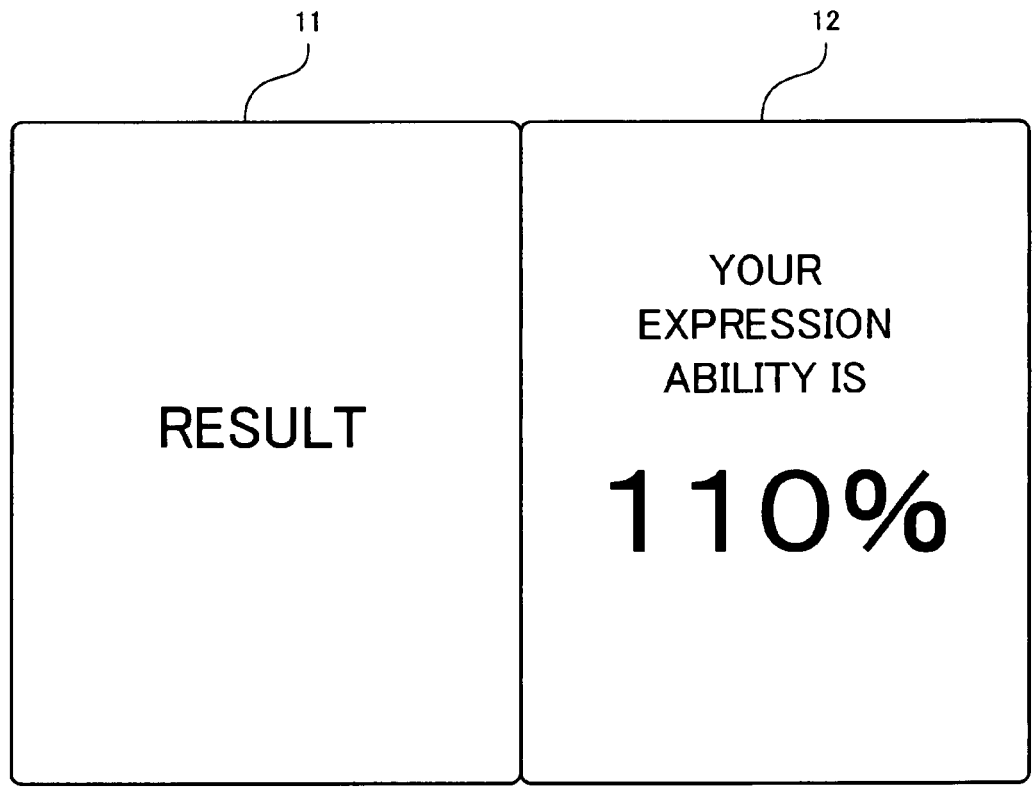
FIG. 13 shows an exemplary image displayed while the training program is executed.

When the four exercises from exercise 1 through exercise 4 are finished, the "expression ability" of the user is evaluated based on the four exercises, and the evaluation result is displayed as shown in FIG. 13. The "expression ability" is an ability of controlling the mimetic muscles. As the user's expression is closer to the expression of the model image 40 in each exercise, the score of the expression ability is higher. In this embodiment, the expression ability is represented with a numerical value in the range of 0% to 200%. The user can obtain an objective evaluation result, and therefore can train the mimetic muscles more effectively than by the conventional method where the user needs to evaluate himself/herself whether he/she can provide the expression of the model while looking at the mirror.

Now, an operation of the game apparatus 10 will be described in more detail.

Figure 14:
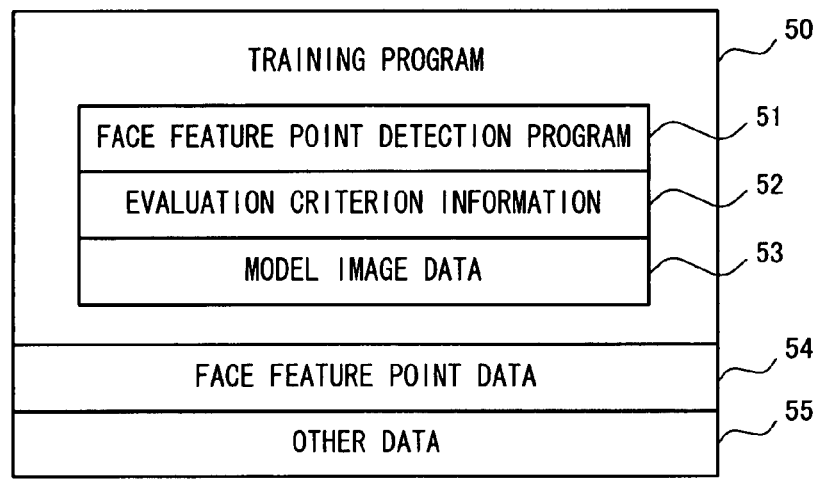
FIG. 14 shows a memory map of a RAM.

FIG. 14 shows a memory map of the RAM 24. The RAM 24 has a training program 50, face feature point data 54 and other data 55 stored thereon. The training program 50 includes a face feature point detection program 51, evaluation criterion information 52 and model image data 53.

The face feature point detection program 51 is a program for detecting the position of a feature point in a face image of the user by executing image processing such as edge detection or the like on the face image of the user taken by the camera cartridge 38. As the face feature point detection program 51, known software such as, for example, FSE (Face Sensing Engine) (registered trademark) of Oki Electric Industry Co., Ltd. is usable.

Figure 15:
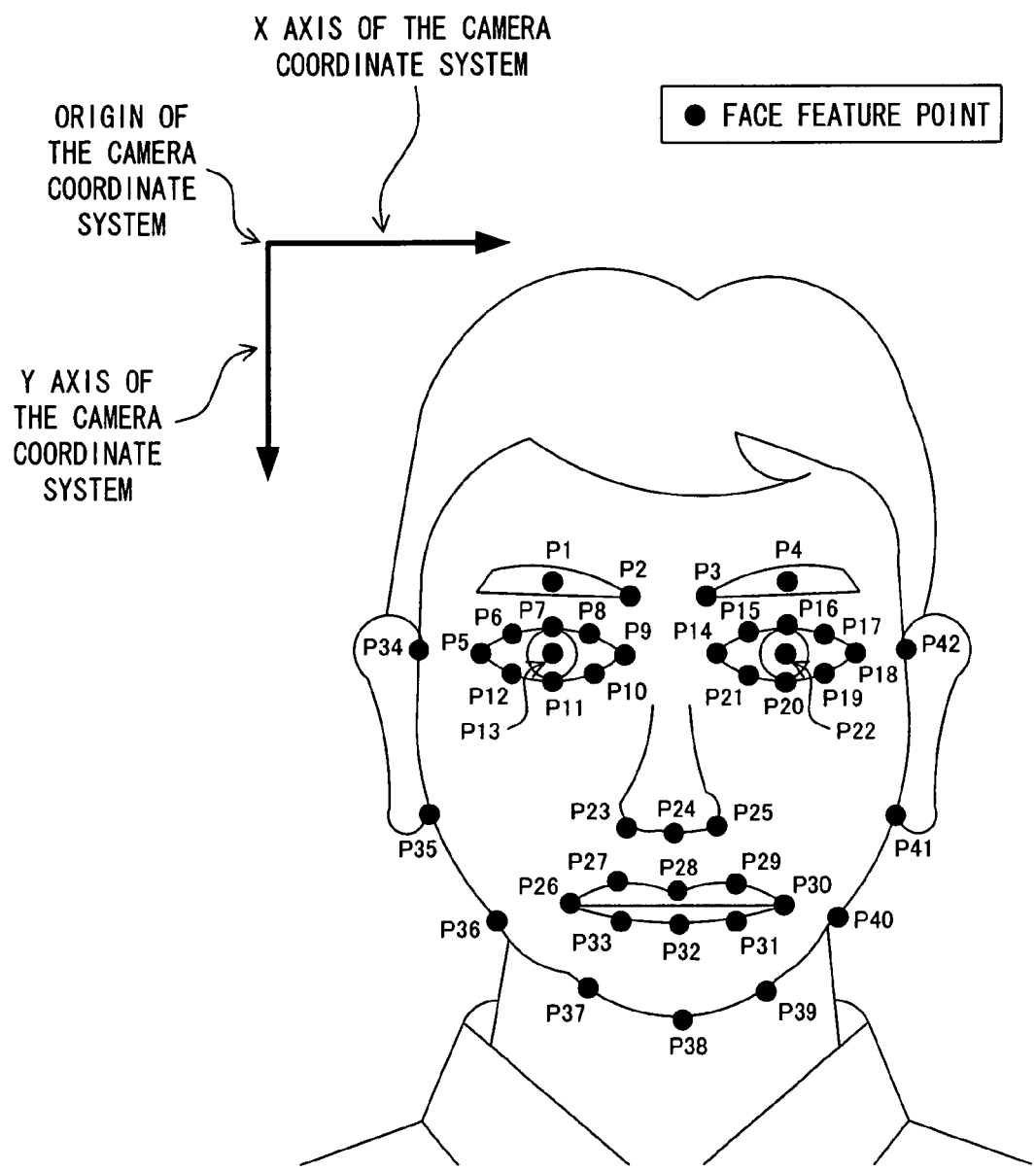
FIG. 15 shows positions of face feature points detected from a face image.

FIG. 15 shows a specific example of face feature points detectable by the face feature point detection program 51. In this embodiment, the face feature point detection program 51 detects 42 face feature points (face feature points P1 through P42) from the face image.

Figure 16:
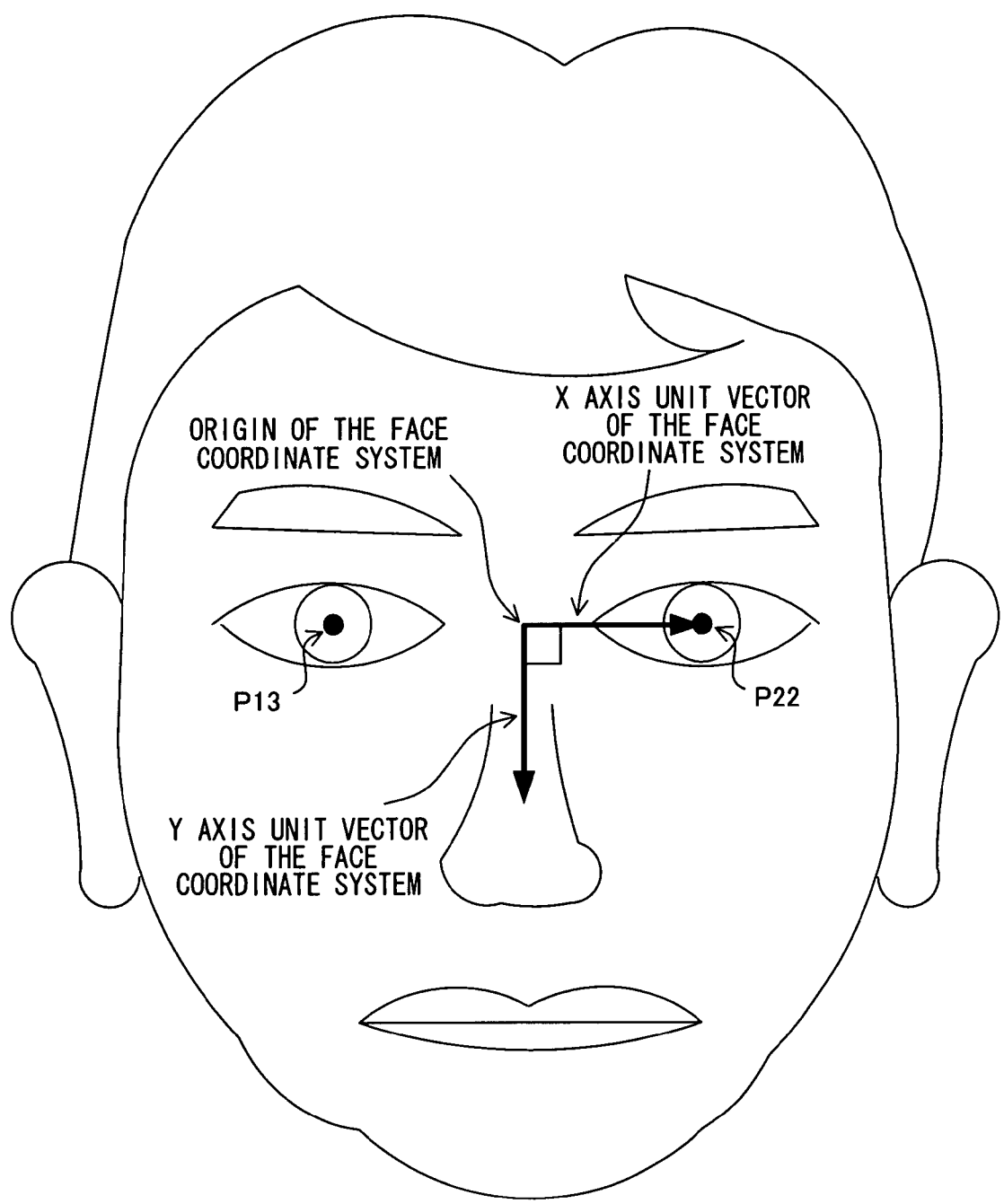
FIG. 16 shows a method for converting a camera coordinate system to a face coordinate system.

The detection result of the face feature point detection program 51 (i.e., the positions of the face feature points P1 through P42) is represented by a two-dimensional camera coordinate system. In this embodiment, in order to make the detection results of the face feature point detection program 51 more easier to utilize, coordinate conversion processing is performed from the camera coordinate system into a face coordinate system. As shown in FIG. 16, in the face coordinate system, a halfway point between both eyes in the face image of the user (P13, P22) is the origin, a vector starting from the origin and terminating at the right eye (P22) is an X axis unit vector, and a vector obtained by rotating the X axis unit vector by 90 degrees clockwise is a Y axis unit vector. Namely, the scale of the X axis and the Y axis in the face coordinate system is determined by the distance between the halfway point between both eyes in the face image of the user (P13, P22) and the right eye. The coordinate set representing the position of each feature point in the face coordinate system is not changed even when the distance between the camera lens 38a and the user's face is changed or even when the user's face rotates around the optical axis of the camera lens 38a. Therefore, with the face coordinate system, the expression of the user can be correctly evaluated. In this embodiment, the face coordinate system is set based on the positions of both eyes in the face image of the user (P13, P22), but the present invention is not limited to this. The face coordinate system may be set based on the positions of any two face feature points.

The coordinate set of each face feature point detected by the face feature point detection program 51 is stored on the RAM 24 as the face feature point data 54. As the face feature point data 54, the reference positions (Po1 through Po42) of the face feature points (P1 through P42) and the current positions (Pc1 through Pc42) of the face feature points (P1 through P42) are stored. The "reference position" is the position of each face feature point in the expressionless state, and the "current position" is the position of each face feature point in the latest face feature point detection result.

The evaluation criterion information 52 is information for evaluating the user's expression. As shown in FIG. 18, a plurality of evaluation items and item score reference values are designated for each given expression. For example, for the given expression "lower the right and left corners of the mouth", eight evaluation items, i.e., "score increased if the left corner of the mouth is lowered", "score increased if the right corner of the mouth is lowered", "score decreased if the left eyebrow is raised", "score decreased if the right eyebrow is raised", "score decreased if the left eyebrow is lowered", "score decreased if the right eyebrow is lowered", "score decreased if the left eye is closed", and "score decreased if the right eye is closed", and eight sets of item score reference values corresponding to the eight evaluation items, i.e., "first threshold value A, second threshold value A, maximum value A" through "first threshold value H, second threshold value H, maximum value H", are designated. The item score reference values are used for calculating the score of each evaluation item (referred to as the "item score" in order to be distinguishable from a zone score, etc. described later) using the face feature point data 54. In this embodiment, the item score reference values are designated as the evaluation criteria, but the present invention is not limited to this. A calculation equation described later, in which the item score reference values such as the first threshold value, the second threshold value and the maximum value are set, may be designated for each evaluation item.

With reference to FIG. 18 through FIG. 21, a method for evaluating the user's expression (more specifically, a method for calculating a score of a face image of the user taken by the camera cartridge 38) will be described specifically. In the following description, the given expression of "lower the right and left corners of the mouth" is used as an example.

Figure 19:
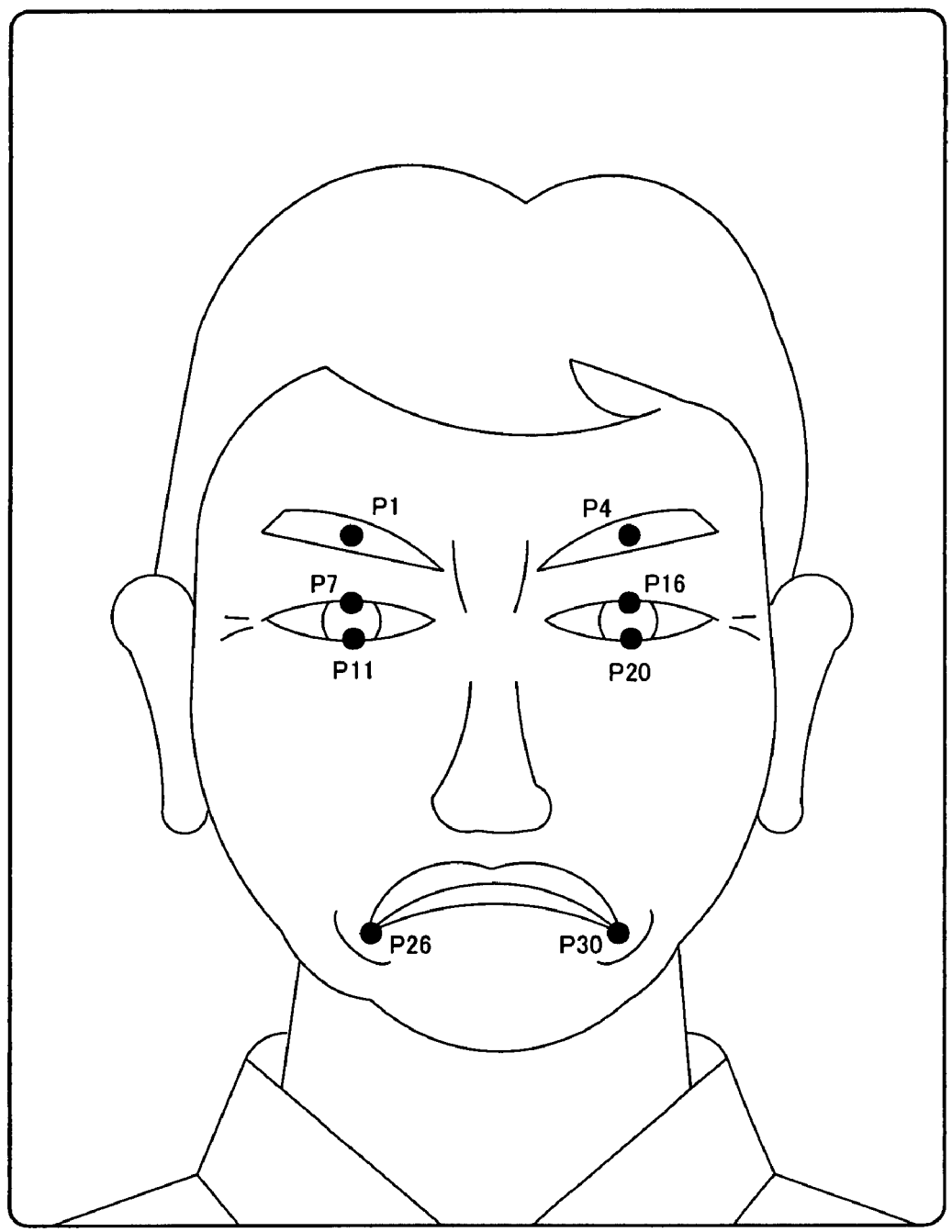
FIG. 19 shows exemplary face feature points used for calculating the score of a face image.

For the given expression of "lower the right and left corners of the mouth", the score of the face image is calculated based on the positions of the eight face feature points (P1, P4, P7, P11, P16, P20, P26 and P30) as shown in FIG. 19.

In the evaluation criterion information 52 shown in FIG. 18, the following evaluation items are designated for the given expression of "lower the right and left corners of the mouth": "score increased if the left corner of the mouth is lowered", "score increased if the right corner of the mouth is lowered", "score decreased if the left eyebrow is raised", "score decreased if the right eyebrow is raised", "score decreased if the left eyebrow is lowered", "score decreased if the right eyebrow is lowered", "score decreased if the left eye is closed", and "score decreased if the right eye is closed".

Figure 20:
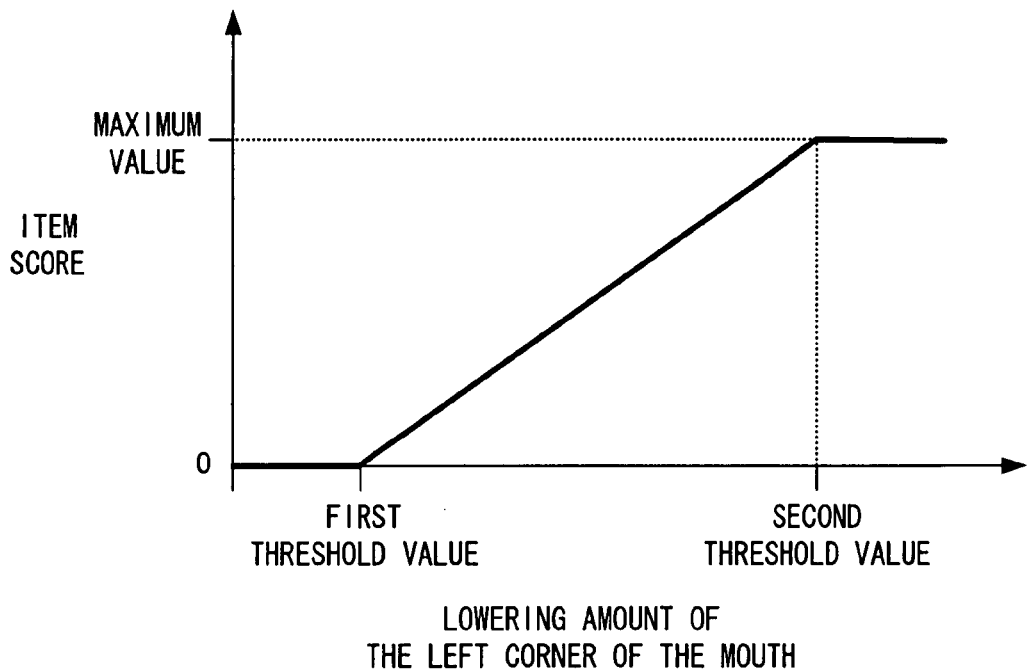
FIG. 20 shows one exemplary method for calculating an item score.

The item score of each evaluation item is calculated referring to the first threshold value data, the second threshold value data and the maximum value data corresponding to the respective evaluation item in the evaluation criterion information 52. For example, the item score on the evaluation item of "score increased if the left corner of the mouth is lowered" is calculated using "first threshold value A, second threshold value A, maximum value A". More specifically, the item score is calculated such that when the change amount of the expression is between "the first threshold value" and the "second threshold value", the score is between 0 point and "the maximum value". When the change amount of the expression is equal to or less than the first threshold value, the score is 0 point; whereas when the change amount of the expression is equal to or more than the second threshold value, the score is the maximum value. Namely, the second threshold value has a meaning as a target value of the change amount of the expression. At least the second threshold value (target value) is set for each evaluation item. However, the first threshold value and the maximum value do not need to be set for each evaluation item. For example, the first threshold value and the maximum value may be a constant value regardless of the evaluation item. When the change amount of the expression is equal to or more than the second threshold value (target value), the score may be further increased, or decreased. In the former case, the expression is evaluated higher when the change amount of the expression is larger. In the latter case, the expression is evaluated higher when the change amount of the expression is closer to the target value. Herein, the "change amount of the expression" may be (a) the distance between the current position and the reference position of a predetermined face feature point in the face image of the user or (b) the distance between a plurality of face feature points. The first threshold value A, the second threshold value A and the maximum value A are set for a common calculation equation in this manner, and then the item score is calculated based on the "lowering amount of the left corner of the mouth". The "lowering amount of the left corner of the mouth" is obtained by subtracting the Y coordinate value b26 of the reference position Po26 of the face feature point P26 corresponding to the left corner of the mouth from the Y coordinate value d26 of the current position Pc26 of the face feature point P26. FIG. 20 shows a specific example in which the "first threshold value A, the second threshold value A, the maximum value A" is set in a common calculation equation. The value obtained by subtracting the Y coordinate value of the reference position of the face feature point from the Y coordinate value of the current position of the face feature point indicates the distance in the Y axis direction from the current position to the reference position of the face feature point. When the distance in the Y axis direction is shorter than the first threshold value, the item score becomes the minimum value (0 in the example of FIG. 20). When the distance in the Y axis direction is longer than the second threshold value, the item score becomes the maximum value. The maximum value is the maximum possible value of the item score calculated from the "lowering amount of the left corner of the mouth". When the "lowering amount of the left corner of the mouth" is equal to or smaller than the first threshold value (e.g., 0), the item score is 0. When the "lowering amount of the left corner of the mouth" is equal to or larger than the second threshold value, the item score is a predetermined maximum value (e.g., 10). When the "lowering amount of the left corner of the mouth" is equal to or larger than the first threshold value and equal to or smaller than the second threshold value, the item score linearly changes in accordance with the "lowering amount of the left corner of the mouth". In this manner, the item score, calculated by the common calculation equation in which "first threshold value A, second threshold value A, maximum value A" are set, is basically higher as the "lowering amount of the left corner of the mouth" is larger. The first threshold value A, the second threshold value A and the maximum value A may be set to any value for each evaluation item.

The item score on the evaluation item of "score increased if the right corner of the mouth is lowered" is calculated using a common calculation equation in which "first threshold value B, second threshold value B, maximum value B" are set. By the common calculation equation in which "first threshold value B, second threshold value B, maximum value B" are set, the item score is calculated based on the "lowering amount of the right corner of the mouth". The "lowering amount of the right corner of the mouth" is obtained by subtracting the Y coordinate value b30 of the reference position Po30 of the face feature point P30 corresponding to the right corner of the mouth from the Y coordinate value d30 of the current position Pc30 of the face feature point P30. The item score, calculated by the common calculation equation in which "first threshold value B, second threshold value B, maximum value B" are set, is basically higher as the "lowering amount of the right corner of the mouth" is larger.

The item score on the evaluation item of "score decreased if the left eyebrow is raised" is calculated using a common calculation equation in which "first threshold value C, second threshold value C, maximum value C" are set. By the common calculation equation in which "first threshold value C, second threshold value C, maximum value B" are set, the item score is calculated based on the "raising amount of the left eyebrow". The "raising amount of the left eyebrow" is obtained by subtracting the Y coordinate value b4 of the reference position Po4 of the face feature point P4 corresponding to the left eyebrow from the Y coordinate value d4 of the current position Pc4 of the face feature point P4. The evaluation item of "score decreased if the left eyebrow is raised" is an item for decreasing the score. Therefore, the item score, calculated by the common calculation equation in which "first threshold value C, second threshold value C, maximum value C" are set, is basically lower as the "raising amount of the left eyebrow" is larger. The maximum value of the item score calculated by the common calculation equation in which "first threshold value C, second threshold value C, maximum value C" are set is 0.

For the other evaluation items, the item scores are calculated in the same manner. The sum of the item scores of the eight evaluation items is the total score of the face image.

In the above-described example, the item score is calculated based on the positional relationship between the reference position and the current position of one face feature point, but the present invention is not limited to this. For example, the item score may be calculated based on the positional relationship between the current position of one face feature point and the current position of another face feature point. For example, for the evaluation item of "score decreased if the mouth is opened" shown in FIG. 18, the item score may be calculated in accordance with the distance between the current position of the upper end of the mouth (P28 in FIG. 15) and the current position of the lower end of the mouth (P32 in FIG. 15).

Figure 21:
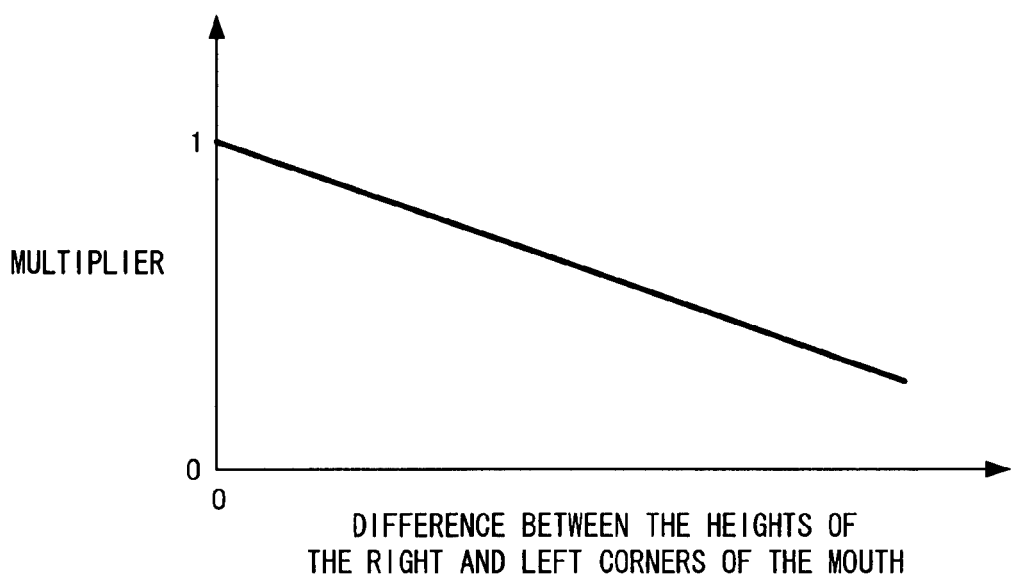
FIG. 21 shows another exemplary method for calculating an item score.

The user's expression may be evaluated using other evaluation criteria than the above-mentioned evaluation items. For example, for the given expression of "lower the right and left corners of the mouth", the item score calculated by the common calculation equation in which "first threshold value A, second threshold value A, maximum value A" are set, or the item score calculated by the common calculation equation in which "first threshold value B, second threshold value B, maximum value B" are set, may be multiplied by a multiplier which is determined in accordance with whether or not the heights of the right and left corners of the mouth are the same. FIG. 21 shows a specific example of such a calculation equation. The "difference between the heights of the right and left corners of the mouth" is a difference (absolute value) between the Y coordinate value d26 of the current position Pc26 of the face feature point P26 corresponding to the left corner of the mouth and the Y coordinate value d30 of the current position Pc30 of the face feature point P30. By performing such a multiplication, as the difference between the heights of the right and left corners of the mouth is larger, the item score on the evaluation item of "score increased if the left corner of the mouth is lowered" and the item score on the evaluation item of "score increased if the right corner of the mouth is lowered" are decreased.

In the above, a method for calculating the score of one face image is described. In the moving exercise and the still exercise, the user's expression is evaluated based on a plurality of face images.

Figure 22:
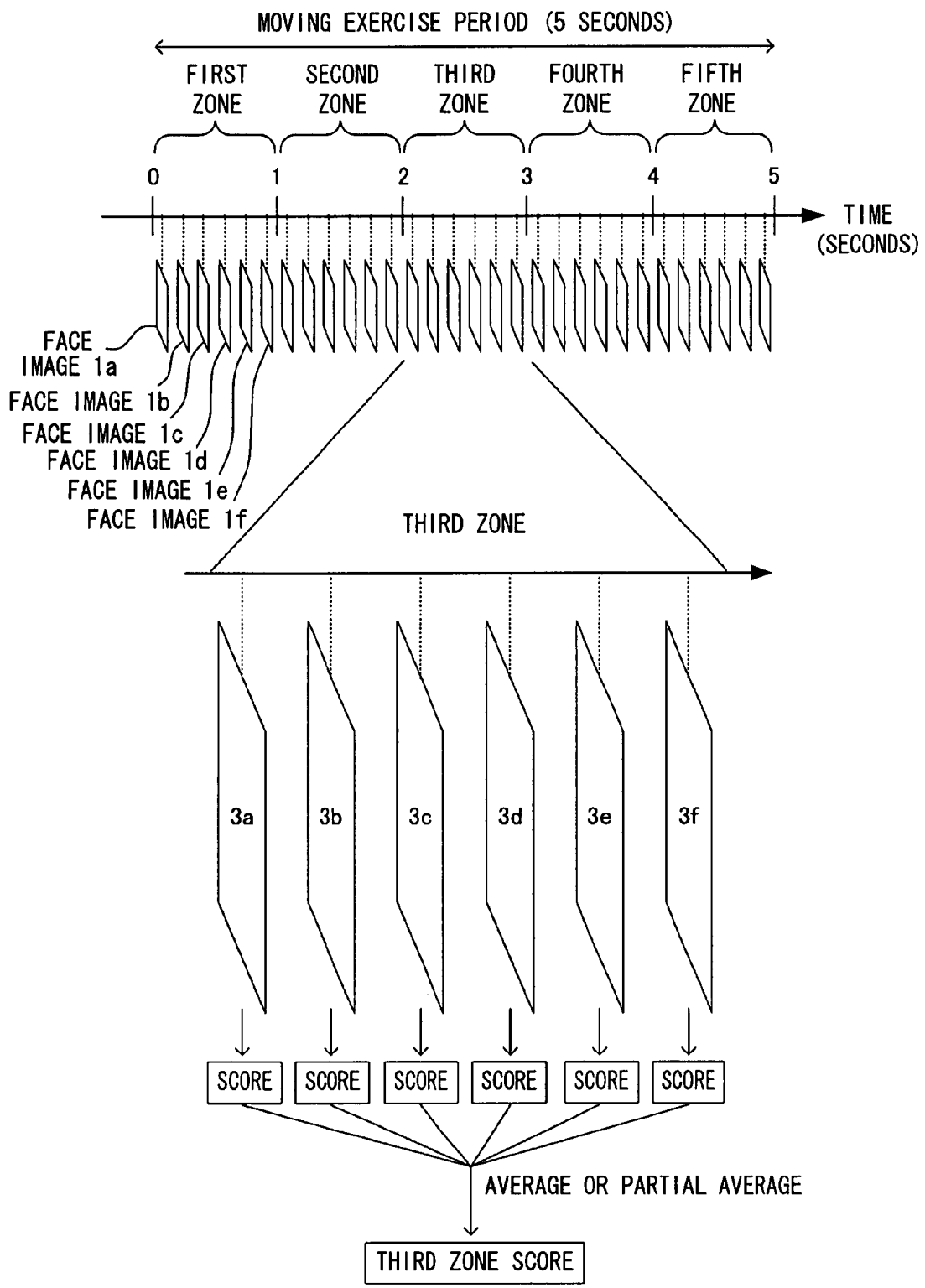
FIG. 22 shows a method for calculating a zone score in a moving exercise.
Figure 23:
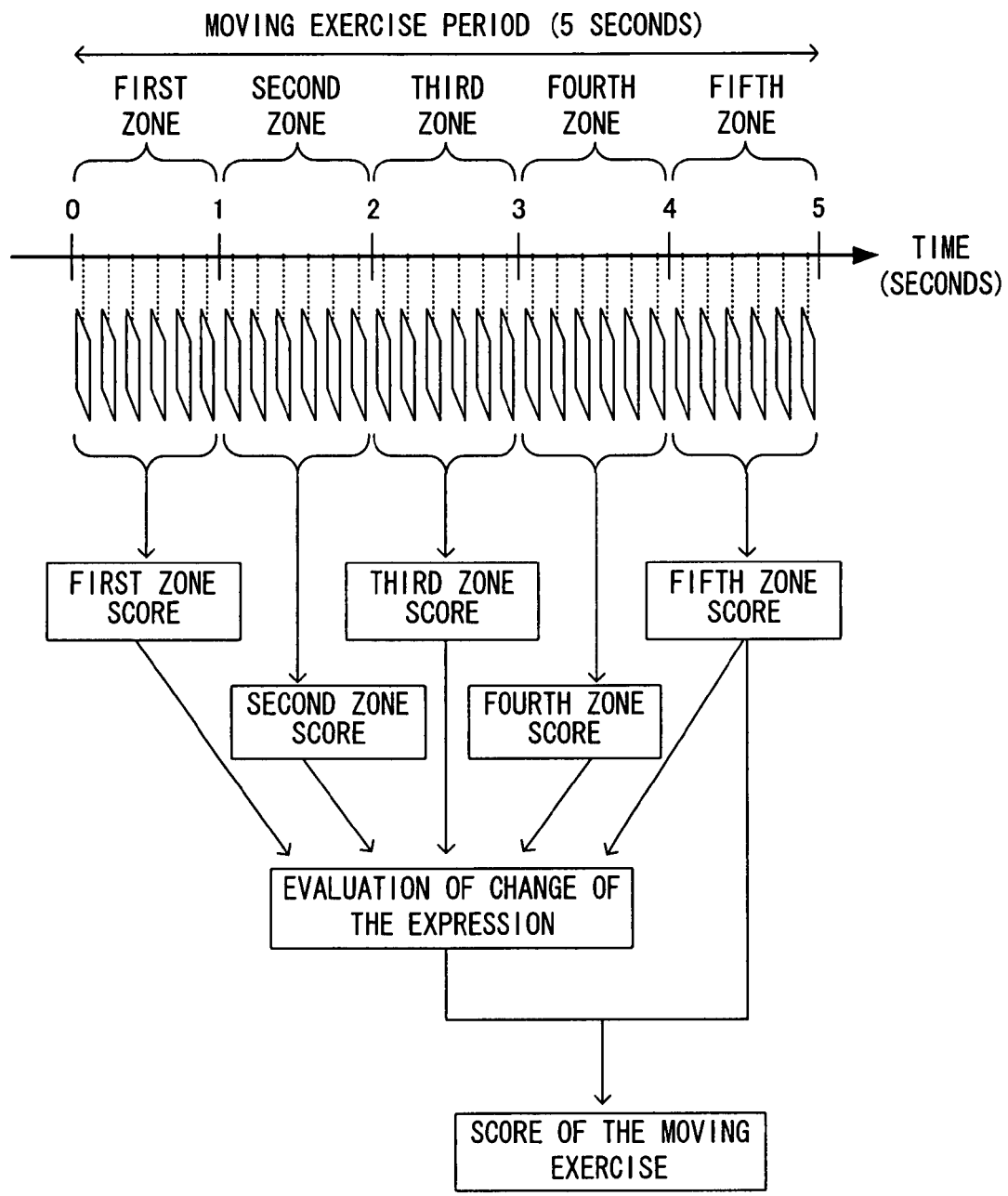
FIG. 23 shows one method for calculating a score of the moving exercise.

With reference to FIG. 22 through FIG. 24, a method for evaluating the user's expression in a moving exercise will be specifically described.

In this embodiment, the face image of the user is taken by the camera cartridge 38 at a cycle of 10 frames (one frame is 1/60 seconds). The score is calculated based on such face images. In this embodiment, the moving exercise is performed for five seconds. Thus, the score of a total of 30 face images is calculated from the start until the end of the moving exercise (hereinafter, referred to as the "moving exercise period").

As shown in FIG. 22, the moving exercise period is divided into five zones. Hereinafter, the first one second from the start of the moving exercise will be referred to as a first zone, the next one second will be referred to as a second zone, the next one second will be referred to as a third zone, the next one second will be referred to as a fourth zone, and the next one second will be referred to as a fifth zone. The six face images taken during the first zone will be referred to as face image 1a, face image 1b, face image 1c, face image 1d, face image 1e and face image 1f, counted from the face image taken earliest. In the same manner, the six face images taken during the second zone will be referred to as face image 2a, face image 2b, face image 2c, face image 2d, face image 2e and face image 2f, counted from the face image taken earliest. The face images taken during the other zones will be referred to in the same manner.

In the moving exercise, a zone score is calculated for each zone divided as described above. Hereinafter, a method for calculating the zone score will be described. In the following description, the score of the third zone (third zone score) will be used as an example.

First, regarding the first face image 3a of the third zone, the item score of each evaluation item is calculated referring to the evaluation criterion information 52, and the calculated item scores are added together to obtain the score of the face image 3a. The scores of the face images 3b through 3f are calculated in the same manner.

Next, the average value of the scores of the face images 3a through 3f is calculated to obtain the third zone score. Namely, the zone score of the third zone is obtained based on the plurality of face images taken during the third zone. For obtaining the zone score, the average value of all the face images 3a through 3f may be obtained or an average value of a part of the face images 3a through 3f may be obtained. Hereinafter, the average value obtained by the latter method will be referred to as a "partial average". In this embodiment, three face images having the higher scores among the face images 3a through 3f are selected, and the average value of these three images is set as the third zone score. An advantage of obtaining the third zone score using a partial average is that even if the score of a part of the face images 3a through 3f is calculated to be lower than the true score due to a detection error of the face feature point detection program 51 or the like, the third zone score is protected from being influenced by such an abnormal score.

The zone scores of the other zones are calculated in the same manner.

When the first through fifth zone scores are calculated as described above, the score of the moving exercise is determined based on the zone scores as shown in FIG. 23. The user's expression of the moving exercise is evaluated roughly from the following two viewpoints.

(1) Whether or not the user's final expression is closer to the expression of the model image 40.

(2) Whether or not the user's expression smoothly changed during the moving exercise period.

The evaluation on viewpoint (1) is made based on the level of the score of the fifth zone score. Specifically, as the fifth zone score is higher, the score of the moving exercise is higher.

The evaluation on viewpoint (2) is made based on the ratio of each of the first through fourth zone scores with respect to the fifth zone score. As shown in FIG. 20, in this embodiment, as the moving amount of the face feature point from the expressionless state is larger, the score of the face image is higher substantially in proportion to the moving amount (linearly to the moving amount). Accordingly, as shown in FIG. 24, when the user smoothly changes the expression in the course of five seconds, the first zone score is about ⅕ of the fifth zone score, the second zone score is about ⅖ of the fifth zone score, the third zone score is about ⅗ of the fifth zone score, and the fourth zone score is about ⅘ of the fifth zone score. As the ratio of each zone score with respect to the fifth zone score is closer to the above-mentioned ideal ratio, the score of the moving exercise is higher.

With reference to FIG. 25, a method for evaluating the user's expression in a still exercise will be specifically described.

In the still exercise also, the face image of the user is taken by the camera cartridge 38 at a cycle of 10 frames (one frame is 1/60 seconds) as in the moving exercise. The score is calculated based on such face images. In this embodiment, the still exercise is performed for five seconds. Thus, the score of a total of 30 face images is calculated from the start until the end of the still exercise (hereinafter, referred to as the "still exercise period").

The still exercise period is not divided into a plurality of zones unlike the moving exercise period. For the sake of explanation, the entire still exercise period will be referred to as the "sixth zone".

For the still exercise, the zone score of the sixth zone (sixth zone score) is calculated by the method described above. Namely, the scores of the 30 face images taken during the sixth zone are each calculated and a partial average of the scores is obtained as the sixth zone score. The sixth zone score is the score of the still exercise.

Hereinafter, with reference to the flowcharts in FIG. 26 through FIG. 33, a flow of processing executed by the CPU core 21 in accordance with the training program 50 will be described.

When the training program 50 is started to be executed, the CPU core 21 executes the following three types of processing in parallel.

A first type of processing is face feature point detection processing executed by the face feature point detection program 51. By the face feature point detection processing, the CPU core 21 detects 42 face feature points from the face images periodically taken by the camera cartridge 38.

Figure 26:
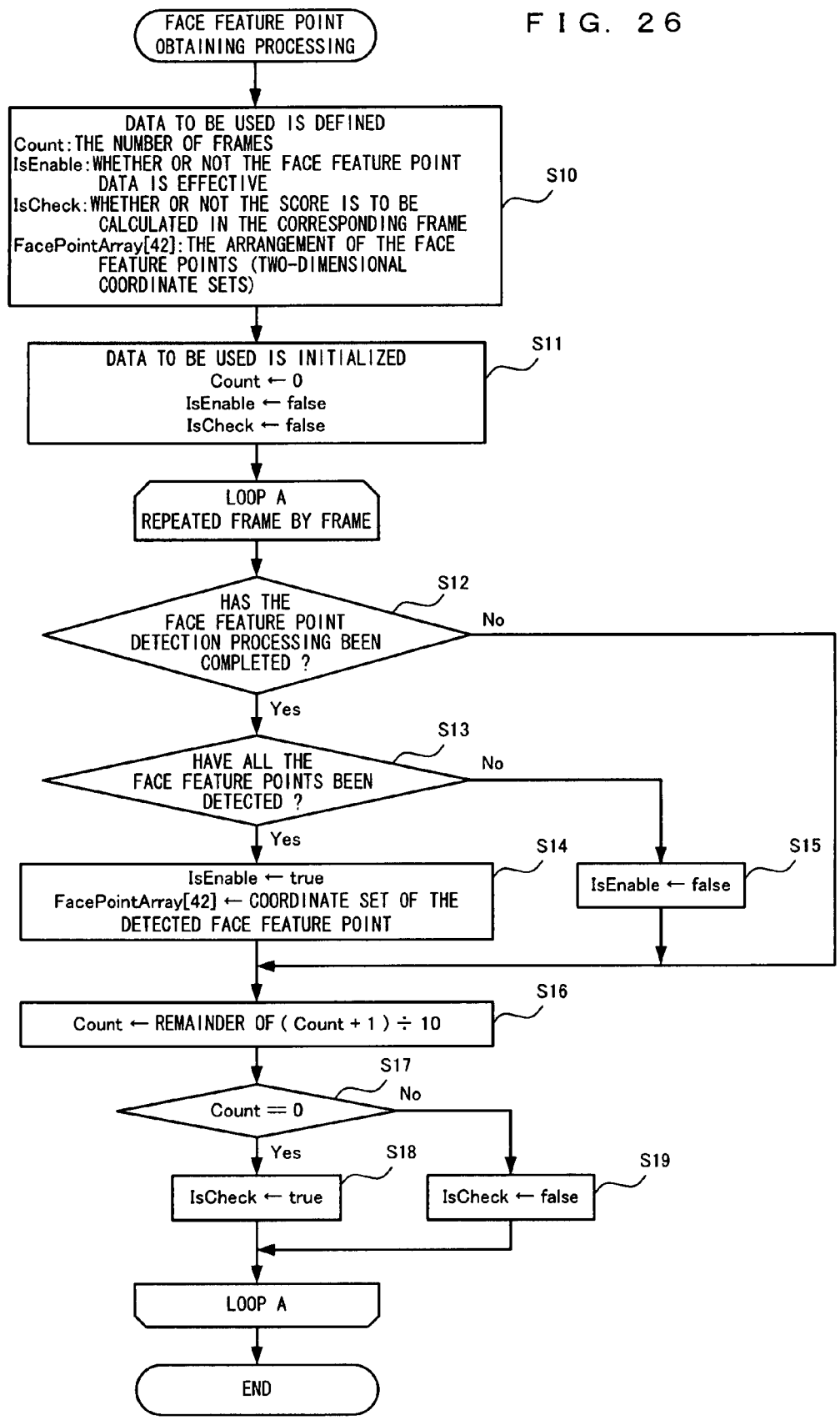
FIG. 26 is a flowchart illustrating a flow of face feature point obtaining processing.

A second type of processing is face feature point obtaining processing shown in FIG. 26. By the face feature point obtaining processing, the CPU core 21 monitors the processing results of the face feature point detection processing by the face feature point detection program 51 and obtains coordinate sets of the face feature points detected by the face feature point detection program 51.

A third type of processing is main processing shown in FIG. 27 through FIG. 33. By the main processing, the CPU core 21 performs score calculation processing and the like as described above with reference to FIG. 15 through FIG. 25 using the coordinate sets of the face feature points obtained by the face feature point obtaining processing. Although not shown in flowcharts, the main processing includes the processing of generating an image as described above with reference to FIG. 4 through FIG. 13.

Now, with reference to FIG. 26, the flow of the face feature point obtaining processing will be described.

At the start of the face feature point obtaining processing, in step S10, the CPU core 21 defines data to be used (i.e., allocates storage areas of the RAM 24 to various types of data). The data defined in this step is as follows.

Count: the number of frames
IsEnable: whether or not the face feature point data is effective
IsCheck: whether or not the score is to be calculated in the corresponding frame
FacePointArray[42]: the arrangement of the face feature points (two-dimensional coordinate sets)

In step S11, the CPU core 21 initializes the data to be used. Specifically, the CPU core 21 initializes the value of Count to 0, initializes the value of IsEnable to false, and initializes the value of IsCheck to false.

Then, the CPU core 21 executes the processing of loop A (i.e., a series of processing of steps S12 through S18 or S19) repeatedly frame by frame.

In step S12, the CPU core 21 determines whether or not the face feature point detection processing by the face feature point detection program 51 has been completed. When the face feature point detection processing has been completed, the CPU core 21 advances the processing to step S13. When the face feature point detection processing has not been completed, the CPU core 21 advances the processing to step S16.

In step S13, the CPU core 21 determines whether or not all the face feature points have been detected by the face feature point detection processing by the face feature point detection program 51. For example, when the user's face is not entirely encompassed in an imaging area of the camera cartridge 38, all the face feature points have not been detected. When all the face feature points have been detected by the face feature point detection processing, the CPU core 21 advances the processing to step S14. When all the face feature points have not been detected, the CPU core 21 advances the processing to step S15.

In step S14, the CPU core 21 updates the value of IsEnable to true, and updates the value of each of elements of FacePointArray[42] to a two-dimensional coordinate set (coordinate set in the camera coordinate system) which indicates the position of the corresponding one of the 42 face feature points detected by the face feature point detection processing.

In step S15, the CPU core 21 updates the value of IsEnable to false.

In step S16, the CPU core 21 updates the value of Count to the remainder of (Count+1)÷10.

In step S17, the CPU core 21 determines whether or not the value of Count is 0. When the value of Count is 0, the CPU core 21 advances the processing to step S18. When the value of Count is not 0, the CPU core 21 advances the processing to step S19.

In step S18, the CPU core 21 updates the value of IsCheck to true and returns the processing to step S12.

In step S19, the CPU core 21 updates the value of IsCheck to false and returns the processing to step S12.

By the processing of steps S16 through S18 (or S19), the value of IsCheck becomes temporarily true at a cycle of 10 frames. In the main processing described later, the score calculation processing described mentioned above is executed when the value of IsCheck is true. Therefore, the score calculation processing is repeated at a cycle of 10 frames.

Next, with reference to FIG. 27, the flow of the main processing will be described.

At the start of the main processing, in step S20, the CPU core 21 defines data to be used. The data defined in this step is as follows.

ScoreSum: total score
Score: zone score
ScoreSlow: score of the moving exercise
NeutralFacePointArray[42]: the arrangement of the reference positions of the face feature points (two-dimensional coordinate sets)

In step S21, the CPU core 21 initializes the data to be used. Specifically, the CPU core 21 initializes the value of ScoreSum to 0.

In step S22, the CPU core 21 executes reference position obtaining processing. The reference position obtaining processing is for storing the position (face coordinate system) of each face feature point of the user in the expressionless state on the RAM 24 as a reference position. Hereinafter, with reference to FIG. 28, the reference position obtaining processing will be described in detail.

At the start of the reference position obtaining processing, in step S30, the CPU core 21 defines data to be used. The data defined in this step is as follows.

Base: the origin of the face coordinate system represented by the camera coordinate system (two-dimensional coordinate set)
XAxis: X axis unit vector of the face coordinate system represented by the camera coordinate system (two-dimensional vector)

YAxis: Y axis unit vector of the face coordinate system represented by the camera coordinate system (two-dimensional vector)

FacePointOriginal[42]: the arrangement of the face feature points (two-dimensional coordinate sets, camera coordinate system)

In step S31, the CPU core 21 displays an instruction message, for example, "look at the right screen in an expressionless state" on the left screen (the screen of the first LCD 11).

In step S32, the CPU core 21 determines whether or not the value of IsEnable is true. When the value of IsEnable is true (which means that the face feature point detection processing and the face feature point obtaining processing have been completed with no problem), the CPU core 21 advances the processing to step S33. When the value of IsEnable is false, the CPU core 21 waits until the value of IsEnable becomes true.

In step S33, the CPU core 21 updates the value of each of elements of FacePointOriginal[42] to the value of the corresponding element of the FacePointArray[42].

In step S34, the CPU core 21 calculates the coordinate set of the halfway point between the left eye and the right eye (camera coordinate system), and updates the value of Base to the coordinate set of the halfway point. The coordinate set of the halfway point between the left eye and the right eye can be obtained by averaging the coordinate set of the left eye and the coordinate set of the right eye included in FacePointArray [42].

In step S35, the CPU core 21 updates the value of XAxis to the value (two-dimensional vector) of the calculation result of "the coordinate set of the center of the right eye—Base".

In step S36, the CPU core 21 updates the value of YAxis to the vector obtained by rotating XAxis by 90 degrees clockwise.

Then, the CPU core 21 executes the processing of loop C (i.e., a series of processing of steps S37 through S38) repeatedly while counting up loop variant I from 0 to 41.

In step S37, the CPU core 21 finds "a" and "b" by calculation such that FacePointOriginal[I]=Base+a×XAxis+b× YAxis.

In step S38, the CPU core 21 updates the value of NeutralFacePoint[I] (two-dimensional coordinate set) to (a, b).

By repeating the processing of steps S37 to S38, the coordinate set indicating the reference position of each face feature point is converted from the coordinate set of the camera coordinate system to that of the face coordinate system, and is stored in NeutralFacePoint[42]. NeutralFacePoint[42] corresponds to the "reference position" of the face feature point data 54 shown in FIG. 17.

When the processing of the loop C is terminated, the reference position obtaining processing is terminated.

Returning to FIG. 27, when the reference position obtaining processing in step S22 is terminated, the CPU core 21 executes the processing of loop B (i.e., a series of processing of steps S23 through S27) repeatedly, for example, four times.

In step S23, the CPU core 21 selects one of a plurality of prepared given expressions, and presents the selected given expression to the user through an image and/or an audio signal. (For example, the image shown in FIG. 4 is displayed on the left screen.) The manner of selecting the given expression is arbitrary. For example, the given expression may be selected in accordance with a predetermined order or randomly. Alternatively, a given expression in accordance with the ability level of the user may be selected.

In step S24, the CPU core 21 executes the moving exercise evaluation processing for the given expression selected in step S23. The moving exercise evaluation processing is for evaluating the user's expression in the moving exercise. Hereinafter, with reference to FIG. 29, the moving exercise evaluation processing will be described in detail.

At the start of the moving exercise evaluation processing, in step S40, the CPU core 21 defines data to be used. The data defined in this step is as follows.

ScoreNum: the number of zone scores which have been calculated

ScoreArray[6]: the arrangement of the zone scores

MaxDataNum: the number of face images used for calculating the zone score

Score: the buffer into which the calculation result of the zone score is put

In step S41, the CPU core 21 initializes the data to be used. Specifically, the CPU core 21 initializes the value of ScoreNum to 1 and initializes the value of MaxDataNum to 6.

In step S42, the CPU core 21 presents the content of the moving exercise to the user through an image and/or an audio signal. (For example, the image shown in FIG. 5 is displayed on the left screen.)

Then, the CPU core 21 executes the processing of loop D (i.e., a series of processing of steps S43 through S45) repeatedly while the value of ScoreNum is less than 6 (as a result, the processing of the loop D is executed five times in repetition).

In step S43, the CPU core 21 executes zone score calculation processing. The zone score calculation processing is for calculating a zone score (each of the first through fifth zone scores in FIG. 23, and the sixth zone score in FIG. 25). Hereinafter, with reference to FIG. 30, the zone score calculation processing will be described in detail.

At the start of the zone score calculation processing, in step S50, the CPU core 21 defines data to be used. The data defined in this step is as follows.

DataNum: the number of processed face feature point data sets (one data set is a set of face feature point data corresponding to one face image)

UsableDataNum: the number of effective face feature point data sets

DataArray[MaxDataNum]: the arrangement of the scores of the face images

FacePoint[42]: the arrangement of the face feature points (two-dimensional coordinate sets, face coordinate system)

In step S51, the CPU core 21 initializes the data to be used. Specifically, the CPU core 21 initializes the value of DataNum to 0 and initializes the value of UsableDataNum to 0.

Then, the CPU core 21 executes the processing of loop F (i.e., a series of processing of steps S52 through S56) repeatedly while the value of DataNum is lower than the value of MaxDataNum.

In step S52, the CPU core 21 executes current position obtaining processing. The current position obtaining processing is for storing the position of each face feature point in the latest face feature point detection result for the user on the RAM 24 as the current position. Hereinafter, with reference to FIG. 31, the current position obtaining processing will be described in detail.

At the start of the current position obtaining processing, in step S60, the CPU core 21 defines data to be used. The data defined in this step is as follows.

Base: the origin of the face coordinate system represented by the camera coordinate system (two-dimensional coordinate set)

XAxis: X axis unit vector of the face coordinate system represented by the camera coordinate system (two-dimensional vector)

YAxis: Y axis unit vector of the face coordinate system represented by the camera coordinate system (two-dimensional vector)

FacePointOriginal[42]: the arrangement of the face feature points (two-dimensional coordinate sets, camera coordinate system)

In step S61, the CPU core 21 determines whether or not the value of IsCheck is true. When the value of IsCheck is true, the CPU core 21 advances the processing to step S62. When the value of IsCheck is false, the CPU core 21 waits until the value of IsCheck becomes true. As described above, the value of IsCheck becomes temporarily true at a cycle of 10 frames.

In step S62, the CPU core 21 determines whether or not the value of IsEnable is true. When the value of IsEnable is true (which means that the face feature point detection processing and the face feature point obtaining processing have been completed with no problem), the CPU core 21 advances the processing to step S63. When the value of IsEnable is false, the current position obtaining processing is terminated.

In step S63, the CPU core 21 updates the value of each of elements of FacePointOriginal[42] to the value of the corresponding element of the FacePointArray[42].

In step S64, the CPU core 21 calculates the coordinate set of the halfway point between the left eye and the right eye (camera coordinate system), and updates the value of Base to the coordinate set of the halfway point. The coordinate set of the halfway point between the left eye and the right eye can be obtained by averaging the coordinate set of the left eye and the coordinate set of the right eye included in FacePointArray [42].

In step S65, the CPU core 21 updates the value of XAxis to the value (two-dimensional vector) of the calculation result of "the coordinate set of the center of the right eye—Base".

In step S66, the CPU core 21 updates the value of YAxis to the vector obtained by rotating XAxis by 90 degrees clockwise.

Then, the CPU core 21 executes the processing of loop G (i.e., a series of processing of steps S67 through S68) repeatedly while counting up loop variant I from 0 to 41.

In step S67, the CPU core 21 finds "a" and "b" by calculation such that FacePointOriginal[I]=Base+a×XAxis+b× YAxis.

In step S68, the CPU core 21 updates the value of FacePoint[I] (two-dimensional coordinate set) to (a, b).

By repeating the processing of steps S67 to S68, the coordinate set indicating the current position of each face feature point is converted from the coordinate set of the camera coordinate system to that of the face coordinate system, and is stored in FacePoint[42]. FacePoint[42] corresponds to the "current position" of the face feature point data 54 shown in FIG. 17.

When the processing of the loop G is terminated, the current position obtaining processing is terminated.

Returning to FIG. 30, when the current position obtaining processing in step S52 is terminated, the CPU core 21 advances the processing to step S53.

Figure 31:
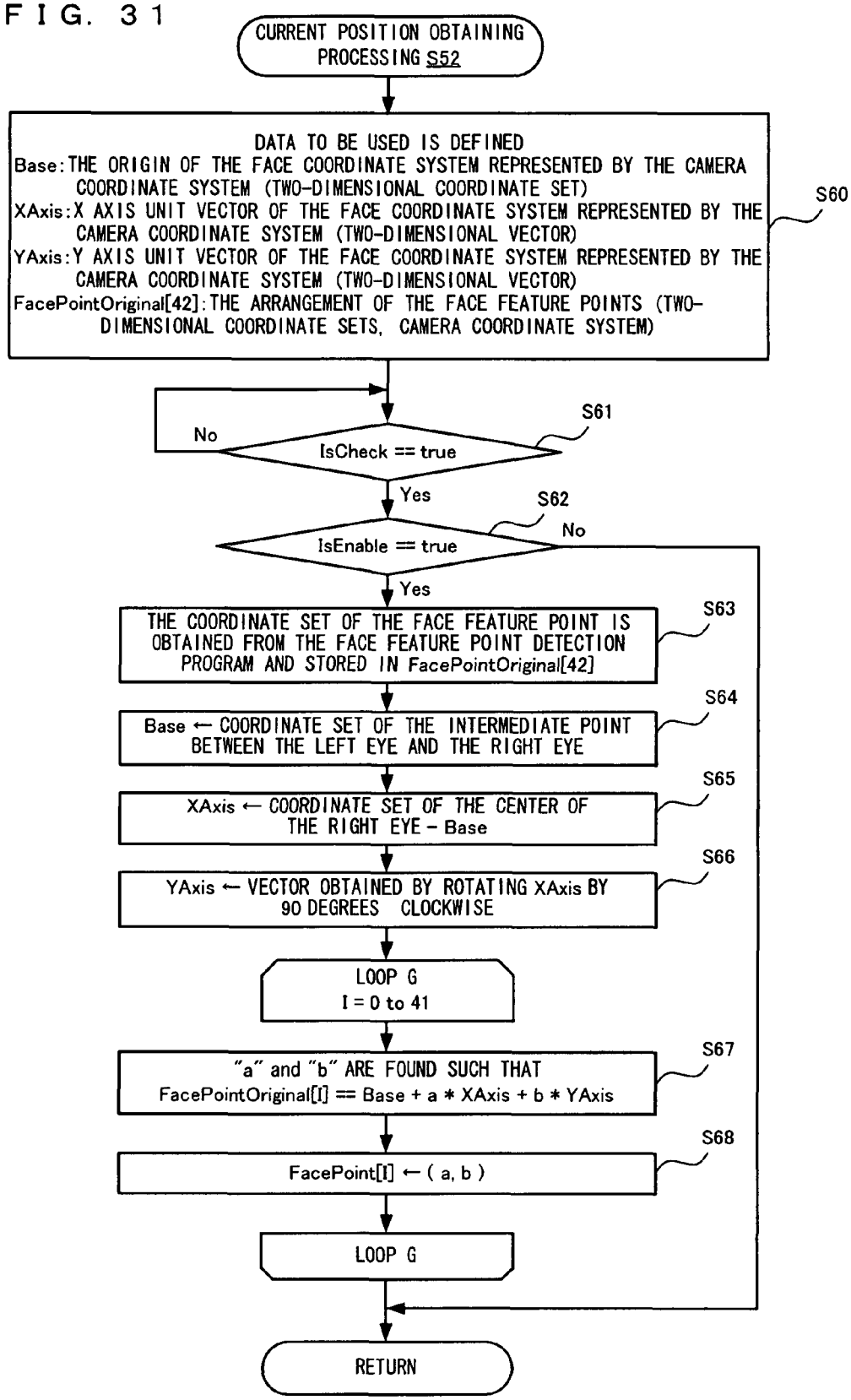
FIG. 31 is a flowchart illustrating a flow of current position obtaining processing.
Figure 32:
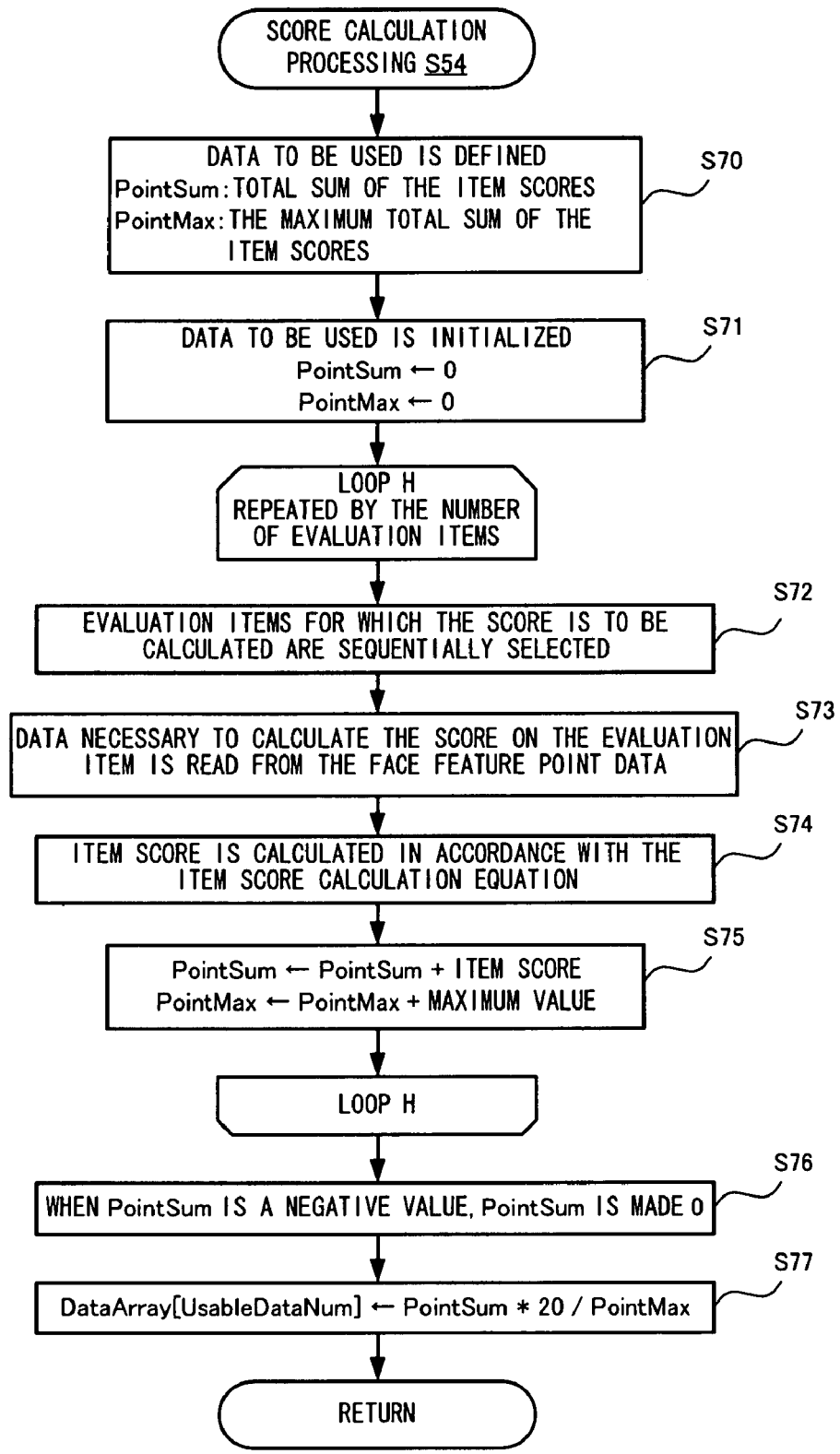
FIG. 32 is a flowchart illustrating a flow of score calculation processing.
Figure 33:
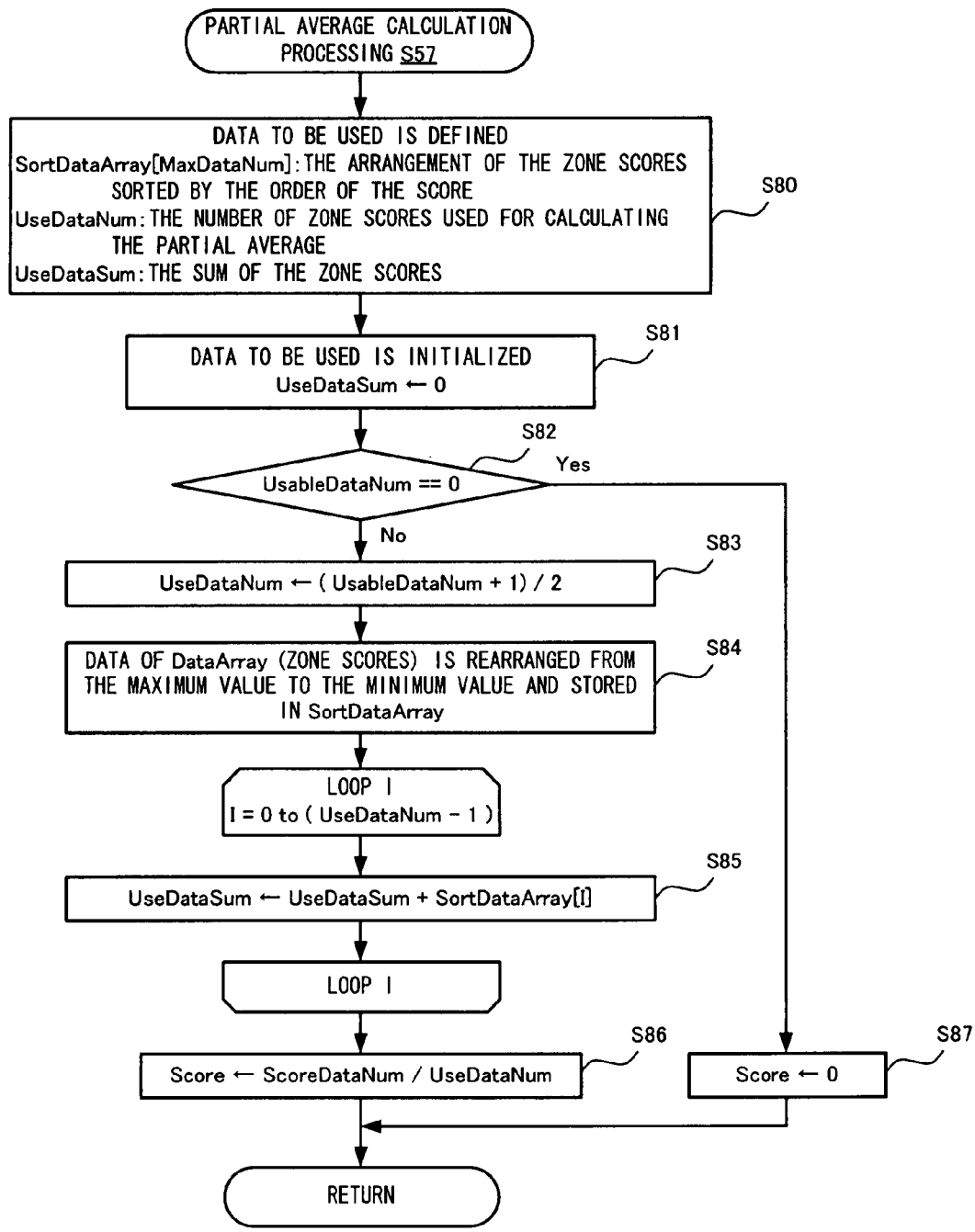
FIG. 33 is a flowchart illustrating a flow of partial average calculation processing.

In step S53, the CPU core 21 determines whether or not the current positions of all the face feature points have been obtained successfully. When the current positions of all the face feature points have been obtained successfully, the CPU core 21 advances the processing to step S54. When the current positions of all the face feature points have not been obtained, the CPU core 21 advances the processing to step S56. For example, when the determination result in step S62 in FIG. 31 is No, the current positions of all the face feature points have not been obtained. Therefore, the CPU core 21 advances the processing to step S56.

In step S54, the CPU core 21 executes score calculation processing. The score calculation processing is for calculating the score of each face image. Hereinafter, with reference to FIG. 32, the score calculation processing will be described in detail.

At the start of the score calculation processing, in step S70, the CPU core 21 defines data to be used. The data defined in this step is as follows.

PointSum: total sum of the item scores

PointMax: the maximum total sum of the item scores

In step S71, the CPU core 21 initializes the data to be used. Specifically, the CPU core 21 initializes the value of PointSum to 0 and initializes the value of PointMax to 0.

Figure 27:
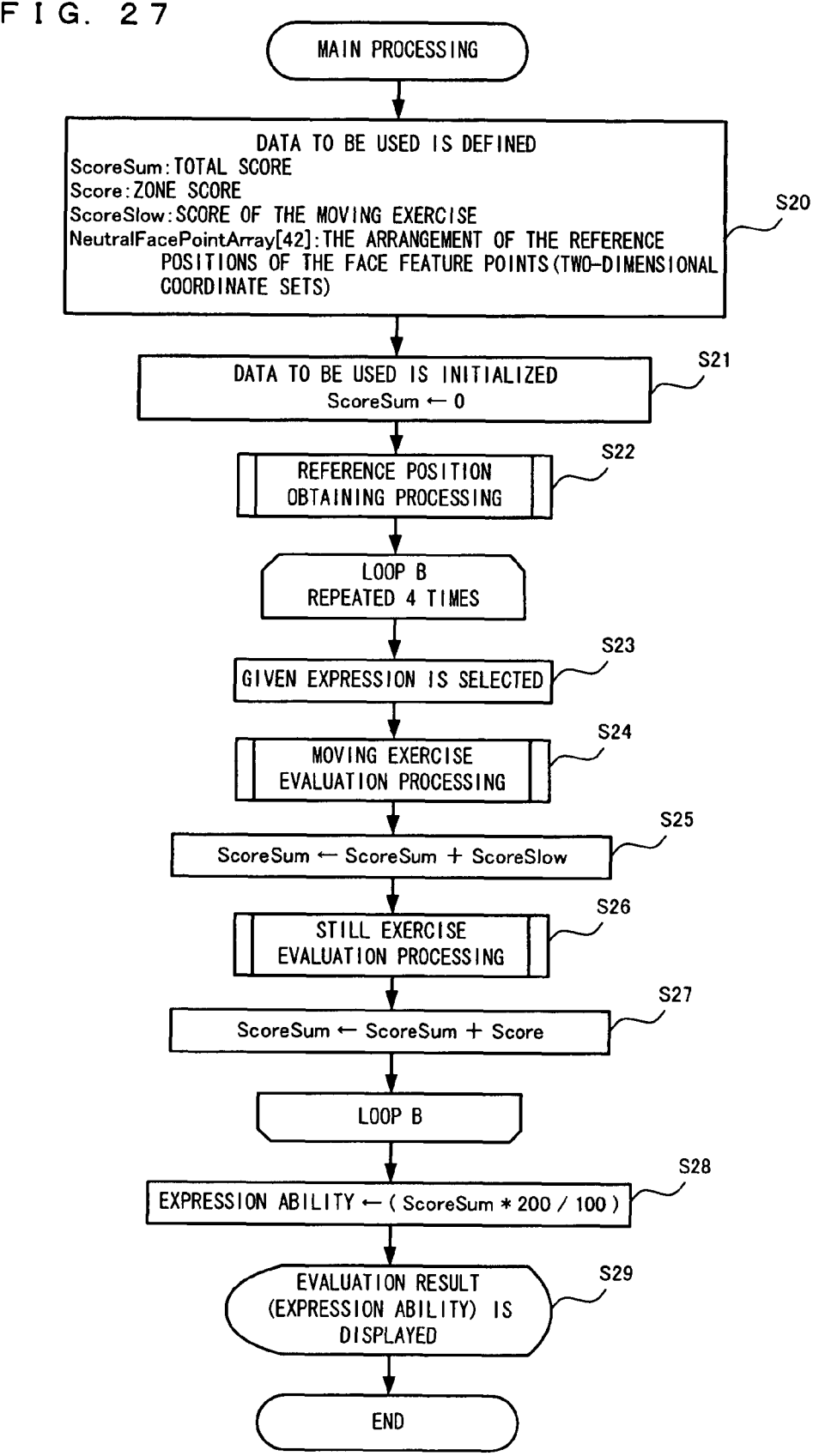
FIG. 27 is a flowchart illustrating a flow of main processing.
Figure 28:
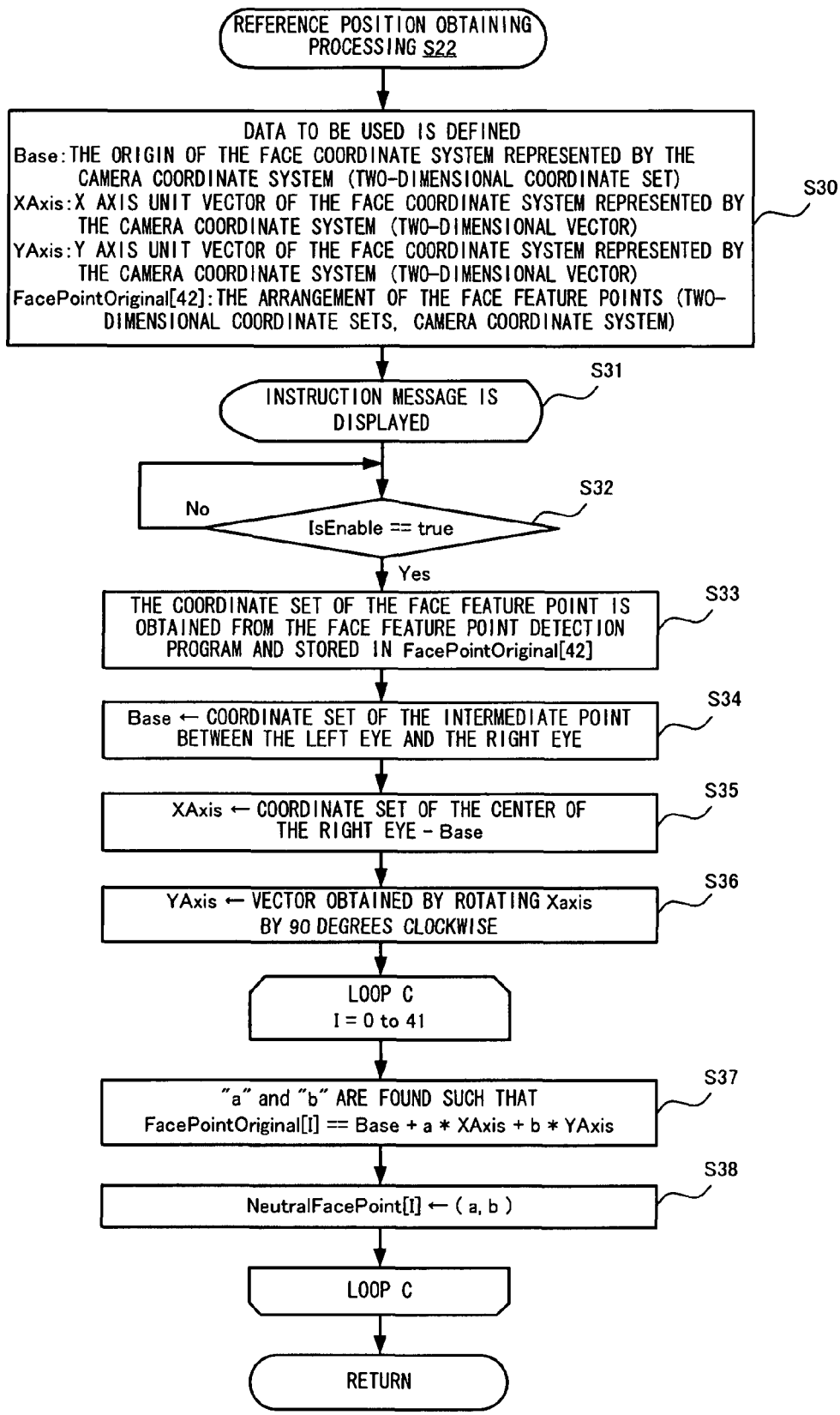
FIG. 28 is a flowchart illustrating a flow of reference position obtaining processing.
Figure 29:
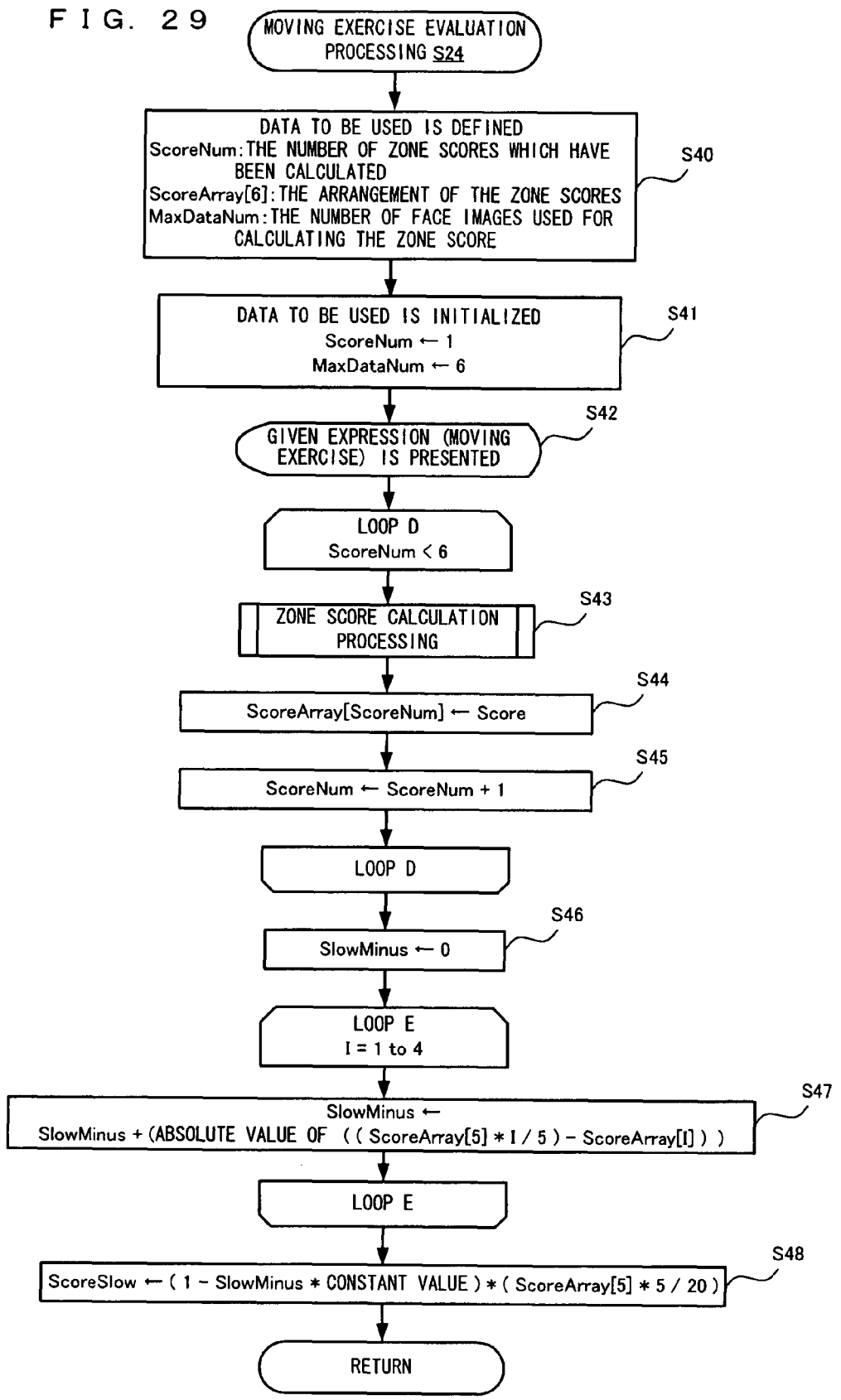
FIG. 29 is a flowchart illustrating a flow of moving exercise evaluation processing.
Figure 30:
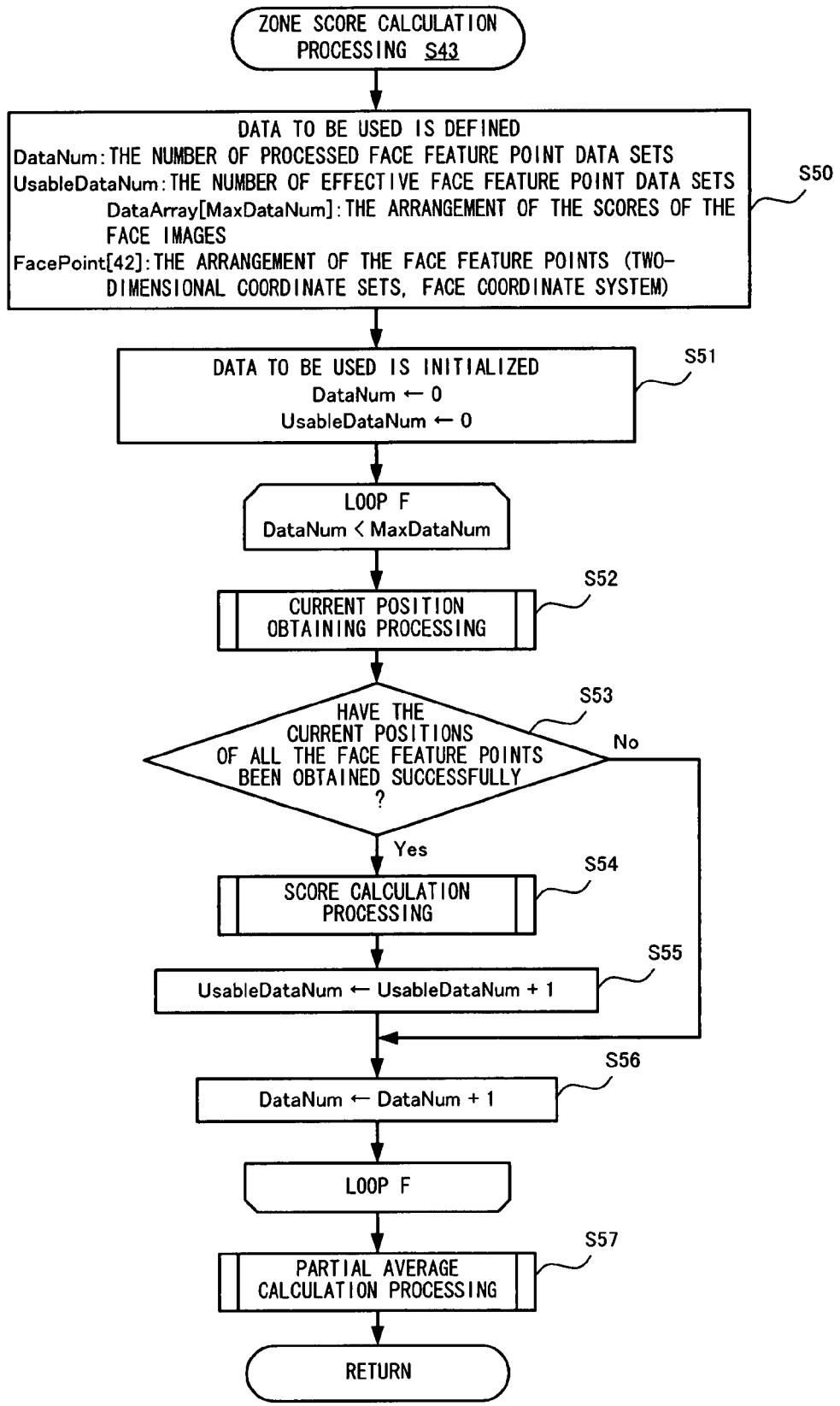
FIG. 30 is a flowchart illustrating a flow of zone score calculation processing.

Then, the CPU core 21 executes the processing of loop H (i.e., a series of processing of steps S72 through S75) repeatedly by the number of evaluation items corresponding to the current given expression (i.e., the given expression selected in step S23 in FIG. 27). For example, when the current given expression is to "close the left eye", the processing of loop H is repeated 11 times because 11 evaluation items are designated as the evaluation criteria for this given expression in the evaluation criterion information 52 shown in FIG. 18.

In step S72, the CPU core 21 sequentially selects the evaluation items for which the score is to be calculated (i.e., the evaluation items for which the score has not been calculated) among the evaluation items corresponding to the current given expression.

In step S73, the CPU core 21 reads data necessary to calculate the score on the evaluation item selected in step S72 from the face feature point data 54. The data necessary to calculate the score on the evaluation item is different for each evaluation item.

In step S74, the CPU core 21 calculates the item score in accordance with the item score reference value corresponding to the evaluation item selected in step S72. For example, when the current given expression is to "close the left eye" and the evaluation item for which the score is to be calculated is "score decreased if the right eye is closed", the item score is calculated in accordance with the "first threshold H, second threshold H, maximum value H" based on the evaluation criterion information 52 in FIG. 18.

In step S75, the CPU core 21 updates the value of PointSum to the value obtained by adding the current value of PointSum and the item score calculated in step S74, and updates the value of PointMax to the value obtained by adding the value of the current value of PointMax and the maximum value of the item score selected in step S72. The maximum value of the item score is a value preset for each evaluation item. For example, the maximum value shown in FIG. 20 is preset for the evaluation item "score increased if the left corner of the mouth is raised" in FIG. 18.

When the processing of loop H is terminated, the value of PointSum represents the total sum of the item scores of the evaluation items corresponding to the current given expression. The value of PointMax is the maximum total sum of the item scores of the evaluation items corresponding to the current given expression.

In step S76, when the value of PointSum is a negative value, the CPU core 21 updates the value of PointSum to 0. This is for making the lower limit of the score of the face image 0.

In step S77, the CPU core 21 updates the value of DataArray[UsableDataNum] to the value of the calculation result of "PointSum×20/PointMax". The calculation of "PointSum×

20/PointMax" is performed in order to convert the total sum of the item scores to a value when the full score is 20. When the processing of step S77 is terminated, the score calculation processing is terminated.

Returning to FIG. 30, when the score calculation processing in step S54 is terminated, the CPU core 21 advances the processing to step S55.

In step S55, the CPU core 21 adds 1 to the value of UsableDataNum.

In step S56, the CPU core 21 adds 1 to the value of DataNum.

When the processing of loop F is terminated, the score of each of the face images taken during the same zone (in the moving exercise, six face images at the maximum) is stored in DataArray.

Then, the CPU core 21 executes partial average calculation processing. The partial average calculation processing is for calculating a partial average of the scores of a plurality of face images. Hereinafter, with reference to FIG. 33, the partial average calculation processing will be described in detail.

At the start of the partial average calculation processing, in step S80, the CPU core 21 defines data to be used. The data defined in this step is as follows.

SortDataArray[MaxDataNum]: the arrangement of the zone scores sorted by the order of the score UseDataNum: the number of zone scores used for calculating the partial average UseDataSum: the sum of the zone scores In step S81, the CPU core 21 initializes the data to be used. Specifically, the CPU core 21 initializes the value of UseDataSum to 0.

In step S82, the CPU core 21 determines whether or not the value of UsableDataNum is 0. When the value of UsableDataNum is 0, the CPU core 21 advances the processing to step S87. When the value of UsableDataNum is not 0, the CPU core 21 advances the processing to step S83.

In step S83, the CPU core 21 updates the value of UsableDataNum to value of the calculation result of (UsableDataNum+1)/2. This means to calculate a partial average of the scores of a half of the plurality of face images taken during the same zone.

In step S84, the CPU core 21 rearranges the values of the elements of DataArray (i.e., the scores of the face images taken in the same zone) from the maximum value to the minimum value, and stores the rearranged values in SortDataArray.

Then, the CPU core 21 executes the processing of loop I (i.e., the processing of step S85) repeatedly while counting up loop variant I from 0 to (UseDataSum−1).

In step S85, the CPU core 21 updates the value of UseDataSum to the value of the calculation result of "UseDataSum+ SortDataArray[I]".

When the processing of loop I is terminated, the value of UseDataSum represents the total sum of the scores of a half of the face images taken in the same zone extracted sequentially from the face image having the maximum score.

In step S86, the CPU core 21 updates the value of Score to the value of the calculation result of ScoreDataNum/UseDataNum. Namely, the value of Score represents the average value of the scores of a half of the face images taken in the same zone extracted sequentially from the face image having the maximum score.

In step S87, the CPU core 21 updates the value of Score to 0.

When the processing of step S86 or S87 is terminated, the partial average calculation processing is terminated.

Returning to FIG. 30, when the partial average calculation processing in step S57 is terminated, the zone score calculation processing is terminated.

Returning to FIG. 29, when the zone score calculation processing in step S43 is terminated, the CPU core 21 advances the processing to step S44.

In step S44, the CPU core 21 updates the value of ScoreArray[ScoreNum] to the value of Score updated by the zone score calculation processing in step S43.

In step S45, the CPU core 21 adds 1 to the value of ScoreNum.

When the processing of loop D is terminated, the scores of the first zone through the fifth zone are respectively stored in ScoreArray[1] through ScoreArray[5].

In step S46, the CPU core 21 initializes the value of SlowMinus to 0.

Then, the CPU core 21 executes the processing of loop E (i.e., the processing of step S47) repeatedly while counting up loop variant I from 1 to 4.

In step S47, the CPU core 21 updates the value of SlowMinus to the value of the calculation result of "SlowMinus+ (absolute value of ((ScoreArray[5]×I/5)−ScoreArray[I]))". The absolute value of ((ScoreArray[5]×I/5)−ScoreArray[I]) represents the difference between the actually calculated zone score and the ideal value calculated based on the score of the fifth score as described above with reference to FIG. 24 (for example, the ideal value of the first zone score is ⅕ of the fifth zone score, and the ideal value of the second zone score is ⅖ of the fifth zone score). Namely, the value of SlowMinus is lower as the user moves the mimetic muscles more smoothly, i.e., more ideally.

When the processing of loop E is terminated, the CPU core 21 advances the processing to step S48.

In step S48, the CPU core 21 updates the value of ScoreSlow to the value of the calculation result of "(1−SlowMinus×constant value)×(ScoreArray[5]×5/20)". This means to convert the fifth zone score from the score when the full score is 20 to a value when the full score is 5, and also to decrease the fifth zone score in accordance with the value of SlowMinus.

When the processing of step S48 is terminated, the moving exercise evaluation processing is terminated.

Returning to FIG. 27, when the moving exercise evaluation processing in step S24 is terminated, the CPU core 21 advances the processing to step S25.

In step S25, the CPU core 21 adds the value of ScoreSlow updated by the moving exercise evaluation processing in step S24 (i.e., the value of the moving exercise) to the value of ScoreSum.

In step S26, the CPU core 21 executes still exercise evaluation processing for the given expression selected in step S23. The still exercise evaluation processing is for evaluating the user's expression in the still exercise. Hereinafter, with reference to FIG. 34, the still exercise evaluation processing will be described in detail.

At the start of the still exercise evaluation processing, in step S90, the CPU core 21 defines data to be used. The data defined in this step is as follows.

MaxDataNum: the number of face images used for calculating the zone score

In step S91, the CPU core 21 initializes the data to be used. Specifically, the CPU core 21 initializes the value of MaxDataNum to 30.

In step S92, the CPU core 21 presents the content of the still exercise to the user through an image and/or an audio signal. (For example, the image shown in FIG. 10 is displayed on the left screen.)

In step S93, the CPU core 21 executes the zone score calculation processing. The zone score calculation processing executed in this step is substantially the same as that executed in step S43 in FIG. 29 except for the number of face images used for calculating the zone score, and thus will not be described here.

When the zone score calculation processing in step S93 is terminated, the still exercise evaluation processing is terminated.

Returning to FIG. 27, when the still exercise evaluation processing in step S26 is terminated, the CPU core 21 advances the processing to step S27.

In step S27, the CPU core 21 adds the value of Score updated by the still exercise evaluation processing in step S26 (i.e., the score of the still exercise) to the value of ScoreSum. When the processing of loop B is terminated (i.e., is repeated four times), the value of ScoreSum represents the total sum of the scores of the moving exercises and the still exercises of the first through fourth exercises.

In step S28, the CPU core 21 calculates "ScoreSum×200/100" to determine the "expression ability". This means to convert the value of ScoreSum from the value when the full score is 100 to a value when the full score is 200. As a result, the "expression ability" is represented with a value in the range of 0 through 200.

In step S29, the CPU core 21 presents the evaluation result of the user's expression (for example, the numerical value of the "expression ability" determined in step S28) to the user through an image and/or an audio signal. (For example, the image shown in FIG. 13 is displayed on the right screen.) Then, the main processing is terminated.

In this embodiment, the face image of the user taken by the camera cartridge 38 is displayed on the right screen. According to the present invention, it is not absolutely necessary to display the user's face image on a screen. In the case where the user's face image is displayed on a screen, the user can perform the exercise while checking his/her own expression and thus the effect of the exercise can be improved.

In this embodiment, the user's expression is evaluated based on both of the results of the moving exercise and the still exercise. Alternatively, the user's expression may be evaluated based on the result of either the moving exercise or the still exercise.

In this embodiment, all the 42 face feature points are first detected from the face image, and then the score of each evaluation item is calculated by referring to the data of the face feature points necessary for the evaluation item. The present invention is not limited to this. Instead of detecting all the 42 face feature points from the face image, only the face feature points necessary for each evaluation item may be detected.

In this embodiment, the score of the face image is calculated based on the positional relationship between the reference position and the current position of a face feature point or the positional relationship between the current positions of different face feature points. The present invention is not limited to this. For example, the score of the face image may be calculated based on, for example, the moving speed of a face feature point (which can be calculated by comparing the current position of a face feature point and the position of the same face feature point in the face image taken a certain time before). In this case, for example, in an exercise of rapidly moving an eyeball rightward and leftward, the score of the face image can be calculated based on the moving speed of the eyeball.

In this embodiment, the evaluation result of the user's expression is represented with a numerical figure. The present invention is not limited to this. For example, the expression or the motion of a character appearing on the screen may be changed in accordance with the evaluation result.

In this embodiment, the zone score is calculated by finding an average or a partial average of a plurality of face images taken in each zone. The present invention is not limited to this. For example, the maximum value or the minimum value of the scores of the plurality of face images taken in each zone may be used as the zone score.

In this embodiment, the partial average is calculated using a half of a plurality of face images taken in each zone which are sequentially selected from the face image having the maximum score. The present invention is not limited to this. For example, among a plurality of face images taken in each zone, a certain number of face images may be sequentially selected from the face image having the maximum score and an average of the scores of such selected face images may be calculated. Alternatively, from a plurality of face images taken in each zone, face images having a score lower than a predetermined score may be eliminated, and an average of the scores of the remaining face images may be calculated.

In this embodiment, as the ratio of each zone score with respect to the fifth zone score is closer to the ideal ratio shown in FIG. 24, the score of the moving exercise is higher. The present invention is not limited to this. For example, the score of the moving exercise may be varied in accordance with whether the zone score is monotonically increased as the imaging time passes (i.e., whether or not the relationship of the first zone score<the second zone score<the third zone score<the fourth zone score<the fifth zone score is fulfilled).

The precision of the processing of obtaining the face feature points depends on the performance level of the imaging device or the analysis precision of the image analysis processing. When the precision of the processing of obtaining the face feature points is low, a site corresponding to a face feature point which is still may be determined to be slightly moving. In preparation for such a determination, it is effective to set strict the criterion by which a site is determined to be moved from a still state. Thus, a site, even if being slightly moved, is not determined to be moved. In this case, however, the criterion by which a site is determined to be moved from a still state is different from the criteria for the other motions. As a result, all the motions cannot be evaluated fairly. For solving this problem, for example, it may be advisable not to use the data obtained when a site is moved from a still state. In this manner, the evaluation is performed by the same criteria.

Figures 34, 35:
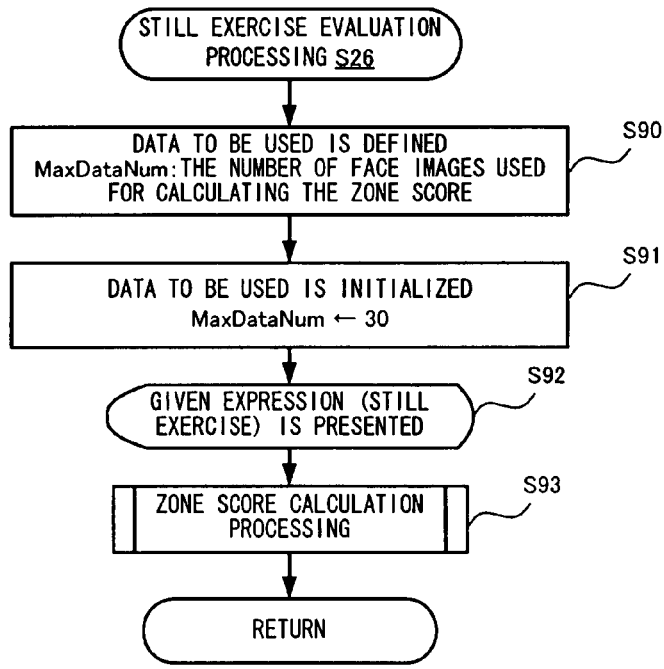
FIG. 34 is a flowchart illustrating a flow of still exercise evaluation processing.
FIG. 35 shows a modification of the evaluation criterion information.

In this embodiment, the user's expression is evaluated such that as the current position of a face feature point is farther from the reference point thereof, the score of the face image is higher. The present invention is not limited to this. For example, as shown in FIG. 35, a target position of one or a plurality of face feature points may be determined for each given expression. By comparing the current position and the target position of the face feature point, the user's expression may be evaluated. (For example, the score of the face image may be set to be higher as the current position is closer to the target position).

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored thereon a training program for supporting a training of mimetic muscles, the training program causing a computer to execute:

selecting a given expression to be made by a user among a plurality of prepared given expressions;

obtaining a face image of the user by an imaging device connected to the computer;

detecting a position of a face feature point corresponding to at least the selected given expression, from the obtained face image;

evaluating the user's expression in the obtained face image based on the detected position of the face feature point, in accordance with an evaluation criterion corresponding to the selected given expression among evaluation criteria respectively preset for the plurality of given expressions; and presenting a result of the evaluation to the user through an image or an audio signal.

2. A non-transitory computer-readable storage medium according to claim 1, wherein:

the evaluation criteria are preset such that a different face feature point is to be referred to in accordance with a different given expression; and in the evaluation, the user's expression in the obtained face image is evaluated by referring to a position of a face feature point corresponding to the selected given expression.

3. A non-transitory computer-readable storage medium according to claim 1, wherein:

in detecting a position of a face feature point, positions of at least two face feature points corresponding to the selected given expression are detected from the obtained face image; and in the evaluation, the user's expression in the face image is evaluated based on the positional relationship between the two detected face feature points.

4. A non-transitory computer-readable storage medium according to claim 3, wherein the evaluation:

calculating a distance between the two detected face feature points; and evaluating the user's expression in the obtained face image based on the calculated distance.

5. A non-transitory computer-readable storage medium according to claim 4, wherein:

target distance data is preset for each of the plurality of given expressions; and in the evaluation, the user's expression in the obtained face image is evaluated by comparing the calculated distance between the two detected face feature points and a distance represented by the target distance data corresponding to the selected given expression among the target distance data preset for each of the plurality of given expressions.

6. A non-transitory computer-readable storage medium according to claim 1, wherein in the evaluation-step, the user's expression in the obtained face image is evaluated based on the positional relationship between the detected position of the face feature point and a reference position of the face feature point stored on a storage device.

7. A non-transitory computer-readable storage medium according to claim 6, wherein:

target distance data is preset for each of the plurality of given expressions; and the evaluation includes:

calculating a distance between the detected position of the face feature point and a reference position of the face feature point stored on the storage device; and evaluating the user's expression in the obtained face image by comparing the calculated distance and a distance represented by the target distance data corresponding to the selected given expression among the target distance data preset for each of the plurality of given expressions.

8. A non-transitory computer-readable storage medium according to claim 6, wherein the training program causes the computer to further execute:

obtaining a face image of the user in an expressionless state by the imaging device as a reference face image;

detecting a position of a preset face feature point in the reference face image; and storing, on the storage device, the detected position of the face feature point as a reference position of the face feature point.

9. A non-transitory computer-readable storage medium according to claim 8, wherein:

positions of a plurality of face feature points in the obtained reference face image are detected;

the positions of the plurality of face feature points in the obtained reference face image are stored on the storage device;

the positions of the plurality of face feature points are detected from the obtained face image;

either one of the plurality of face feature points is designated as a face feature point to be used for evaluating the face image for each of the plurality of given expressions; and in the evaluation, the user's expression in the obtained face image is evaluated by comparing the position of the face feature point corresponding to the selected given expression among the plurality of detected face feature points and the position of the face feature point corresponding to the selected given expression among the plurality of stored face feature points, in accordance with the evaluation criterion corresponding to the selected given expression.

10. A non-transitory computer-readable storage medium according to claim 6, wherein the evaluation includes:

calculating a distance between the detected position of the face feature point and a reference position of the face feature point stored on the storage device; and evaluating the user's expression in the obtained face image based on the calculated distance.

11. A non-transitory computer-readable storage medium according to claim 1, wherein:

in the evaluation, a score of the obtained face image is calculated based on the detected position of the face feature point in accordance with the evaluation criterion corresponding to the selected given expression among the evaluation criteria respectively preset for the plurality of given expressions; and the score calculated in the evaluation is presented to the user through an image or an audio signal.

12. A non-transitory computer-readable storage medium according to claim 1, wherein:

a plurality of face images taken at different times during a predetermined time period are obtained;

a position of a face feature point corresponding to at least the selected given expression is detected from each of the plurality of obtained face images; and the user's expression in the plurality of obtained face images is evaluated based on the positions of the face feature points in the plurality of face images detected in the face feature point detection step.

13. A non-transitory computer-readable storage medium according to claim 12, wherein the plurality of face images are each obtained at a cycle of a constant time period.

14. A non-transitory computer-readable storage medium according to claim 12, wherein the evaluation includes:

calculating a score of each of the plurality of obtained face images in the predetermined time period based on the detected position of the face feature point in the respective face image; and evaluating the user's expression in the plurality of obtained face images in the predetermined time period, using scores of the plurality of face images other than at least one score which is equal to or lower than a certain value or which is relatively low.

15. A non-transitory computer-readable storage medium according to claim 12, wherein the evaluation includes:

calculating a score of each of the plurality of obtained face images in the predetermined time period based on the detected position of the face feature point in the respective face image; and obtaining an average of the scores of the plurality of obtained face images in the predetermined time period, and evaluating the user's expression in the face images using the average.

16. A non-transitory computer-readable storage medium according to claim 12, wherein the evaluation includes:

evaluating the user's expression in each of the plurality of obtained face images based on the detected position of the face feature point in the respective face image, such that the user's expression is evaluated higher as the face image is closer to the selected given expression; and evaluating the user's expression in accordance with whether or not a face image taken later is evaluated higher, based on the result of evaluating the user's expression in each of the plurality of obtained face images.

17. A non-transitory computer-readable storage medium according to claim 16, wherein the evaluation includes:

calculating the score of each of the plurality of obtained face images based on the detected position of the face feature point;

correcting the score of at least one face image in accordance with whether or not a face image taken later is evaluated higher; and evaluating the user's expression in accordance with at least the corrected score.

18. A non-transitory computer-readable storage medium according to claim 13, wherein:

the training is for smoothly changing an expressionless state to a given expression at a constant speed; and the evaluation includes:

calculating the score of each of the obtained face images based on the detected position of the face feature point in the respective face image, such that a face image closer to the selected given expression is evaluated higher; and evaluating the user's expression in accordance with whether or not the scores of the face images linearly increase in accordance with the time at which the face images are taken.

19. A non-transitory computer-readable storage medium according to claim 18, wherein:

the evaluation includes:

calculating the score of each of the obtained face images based on the detected position of the face feature point in the respective face image;

correcting the score of at least one face image in accordance with whether or not the scores of the face images linearly increase in accordance with the time at which the face images are taken; and evaluating the user's expression in accordance with at least the corrected score.

20. A non-transitory computer-readable storage medium according to claim 1, wherein:

a plurality of face images taken at different times are obtained;

a position of a face feature point corresponding to at least the selected given expression is detected from each of the plurality of obtained face images; and the evaluation includes:

calculating a score of each of the plurality of obtained face images based on the detected position of the face feature point in the respective face image;

calculating at least one of a maximum value, a minimum value, an average value and a partial average value of the scores of the plurality of face images; and evaluating the user's expression in accordance with the at least one of the maximum value, the minimum value, the average value and the partial average value.

21. A non-transitory computer-readable storage medium according to claim 20, wherein the evaluation includes:

calculating a score of each of the plurality of obtained face images based on the detected position of the face feature point in the respective face image;

calculating an average of the scores of a part of the plurality of face images having a relatively high score as a partial average value of the plurality of face images; and evaluating the user's expression in accordance with the partial average value.

22. A non-transitory computer-readable storage medium according to claim 1, wherein:

a plurality of face images taken at different times during a predetermined time period are obtained;

a position of a face feature point corresponding to at least the selected given expression is detected from each of the plurality of obtained face images; and the evaluation includes:

calculating a score of each of a plurality of face images obtained in each of a plurality of zones included in the predetermined time period, based on the detected position of the face feature point in the respective face image;

calculating a zone score of each zone based on the scores of the plurality of face images obtained in the respective zone; and evaluating the user's expression in accordance with the zone scores of the plurality of zones.

23. A non-transitory computer-readable storage medium according to claim 1, wherein:

positions of at least a first face feature point and a second face feature point are detected from the obtained face image; and the evaluation includes:

increasing a score of the obtained face image based on the positional relationship between the detected position of the first face feature point and a reference position of the first face feature point stored on the storage device; and decreasing the score of the obtained face image based on the positional relationship between the detected position of the second face feature point and a reference position of the second face feature point stored on the storage device.

24. A non-transitory computer-readable storage medium according to claim 1, wherein:

positions of at least a first face feature point and a second face feature point are detected from the obtained face image; and the evaluation includes:

increasing a score of the obtained face image based on the positional relationship between the detected position of the first face feature point and a reference position of the first face feature point stored on the storage device;

increasing the score of the obtained face image based on the positional relationship between the detected position of the second face feature point and a reference position of the second face feature point stored on the storage device; and varying the score of the obtained face image based on the positional relationship between the position of the first face feature point and the detected position of the second face feature point.

25. A non-transitory computer-readable storage medium according to claim 1, wherein the training program causes the computer to further execute:

setting an origin and a coordinate axis of a face coordinate system based on positions of at least two predetermined face feature points among a plurality of detected face feature points; and converting a coordinate set representing the detected position of each of the face feature points to a set coordinate set of the face coordinate system.

26. A non-transitory computer-readable storage medium according to claim 25, wherein a direction of the coordinate axis of the face coordinate system is set based on a direction of a straight line connecting at least two predetermined face feature points among the plurality of detected face feature points.

27. A non-transitory computer-readable storage medium according to claim 25, wherein a scale of the coordinate axis of the face coordinate system is set based on a distance between at least two predetermined face feature points among the plurality of detected face feature points.

28. A non-transitory computer-readable storage medium according to claim 1, wherein the training program causes the computer to further execute displaying a model image corresponding to the selected given expression on a screen.

29. A non-transitory computer-readable storage medium according to claim 28, wherein the model image is an animation image.

30. A non-transitory computer-readable storage medium according to claim 1, wherein the training program causes the computer to further execute displaying a face image of the user taken by the imaging device on a screen.

31. A non-transitory computer-readable storage medium according to claim 1, wherein the training program causes the computer to further execute displaying a model image corresponding to the selected given expression and a face image of the user taken by the imaging device on an identical screen or on different screens simultaneously.

32. A training apparatus for supporting a training of mimetic muscles, the training apparatus comprising:

a processor;

at least one input and display device coupled to said processor;

a memory coupled to said processor, said memory storing instructions that, when executed by said processor, control said processor to:

(a) select a given expression to be made by a user among a plurality of prepared given expressions;

(b) obtain a face image of the user by an imaging device;

(c) detect a position of a face feature point corresponding to at least the selected given expression, from the obtained face image;

(d) evaluate the user's expression in the obtained face image based on the detected position of the face feature point, in accordance with an evaluation criterion corresponding to the selected given expression among evaluation criteria respectively preset for the plurality of given expressions; and (e) present a result of the evaluation to the user through an image or an audio signal.

33. A method for supporting a training of mimetic muscles, the method comprising:

selecting a given expression to be made by a user among a plurality of prepared given expressions;

obtaining a face image of the user by an imaging device;

detecting a position of a face feature point corresponding to at least the selected given expression, from the obtained face image;

evaluating the user's expression in the obtained face image based on the detected position of the face feature point, in accordance with an evaluation criterion corresponding to the selected given expression among evaluation criteria respectively preset for the plurality of given expressions; and presenting a result of the evaluation in the evaluation step to the user through an image or an audio signal.

* * * * *